(12) United States Patent
Akiyama

(10) Patent No.: US 11,487,194 B2
(45) Date of Patent: Nov. 1, 2022

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventor: Koichi Akiyama, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 17/560,348

(22) Filed: Dec. 23, 2021

(65) Prior Publication Data

US 2022/0206376 A1 Jun. 30, 2022

(30) Foreign Application Priority Data

Dec. 25, 2020 (JP) ............................. JP2020-216614
Mar. 5, 2021 (JP) ............................. JP2021-035312

(51) Int. Cl.
*G03B 21/20* (2006.01)

(52) U.S. Cl.
CPC ....... *G03B 21/204* (2013.01); *G03B 21/2066* (2013.01)

(58) Field of Classification Search
None
See application file for complete search history.

(56) References Cited

U.S. PATENT DOCUMENTS

| 2008/0123343 A1 | 5/2008 | Kobayashi et al. |
| 2018/0231881 A1 | 8/2018 | Akiyama |
| 2020/0049323 A1 | 2/2020 | Arakawa |

FOREIGN PATENT DOCUMENTS

| JP | 2008-026853 A | 2/2008 |
| JP | 2008-112114 A | 5/2008 |
| JP | 2013-250494 A | 12/2013 |
| JP | 2018-132594 A | 8/2018 |
| JP | 2020-30224 A | 2/2020 |

*Primary Examiner* — Elmito Breval
(74) *Attorney, Agent, or Firm* — Oliff PLC

(57) ABSTRACT

A wavelength conversion element includes a wavelength conversion layer having a light incident surface and converting a first light into a second light, a substrate having a support surface, a first optical member having a first optical layer transmitting the first light and reflect the second light, a second optical member having a second optical layer reflecting the second light and crossing the support surface and the first optical layer, a third optical member having a third optical layer reflecting the second light and facing the second optical layer. An opening is formed by the substrate and the first, second and third optical members. A first area of the light incident surface is larger than a second area of a light incident area. The second area is larger than a third area of the opening. The second light is emitted from the opening.

23 Claims, 14 Drawing Sheets

LOWER REFLECTANCE    HIGHER REFLECTANCE

US 11,487,194 B2

WAVELENGTH CONVERSION ELEMENT, LIGHT SOURCE DEVICE, AND PROJECTOR

The present application is based on, and claims priority from JP Application Serial Number 2020-216614, filed Dec. 25, 2020, and JP Application Serial Number 2021-035312, filed Mar. 5, 2021, the disclosure of which is hereby incorporated by reference herein in its entirety.

BACKGROUND

1. Technical Field

The present disclosure relates to a wavelength conversion element, a light source device, and a projector.

2. Related Art

As a light source device used for a projector, there is a light source device which reduces an etendue to thereby illuminate an illumination target such as a liquid crystal panel with a high degree of luminance (see, e.g., JP-A-2008-026853, JP-A-2008-112114). In recent years, as the light source device used for a projector, there is also a light source device which uses fluorescence generated by exciting a phosphor as illumination light.

In general, by reducing the incident area of excitation light on the phosphor, it is possible to reduce the etendue of the fluorescence. However, when reducing the incident area of the excitation light, there is a problem that the light density of the excitation light increases, and thus, the fluorescence conversion efficiency decreases.

As described above, in the past, it is difficult to reduce the etendue while suppressing an increase in light density of the excitation light.

SUMMARY

In view of the problems described above, according to a first aspect of the present disclosure, a wavelength conversion element includes a wavelength conversion layer having a light incident surface, the wavelength conversion layer being configured to convert a first light which has a first wavelength band and is incident on the light incident surface into a second light which has a second wavelength band different from the first wavelength band, a substrate having a support surface configured to support the wavelength conversion layer, a first optical member having a first optical layer configured to transmit the first light and reflect the second light, the first optical layer facing the support surface, a second optical member having a second optical layer configured to reflect the second light, the second optical layer crossing the support surface and the first optical layer, and a third optical member having a third optical layer configured to reflect the second light, the third optical layer crossing the support surface and the first optical layer and facing the second optical layer. An opening is formed by the substrate, the first optical member, the second optical member, and the third optical member. A first area of the light incident surface of the wavelength conversion layer is larger than a second area of a light incident area on which the first light is incident in the light incident surface. The second area of the light incident area is larger than a third area of the opening. The second light is emitted from the opening.

According to a second aspect of the present disclosure, a light source device includes a light source configured to emit the first light, and the wavelength conversion element according to the first aspect of the present disclosure.

According to a third aspect of the present disclosure, a light source device includes a light source configured to emit a first light having a first wavelength band, a first optical element which the first light enters, the first optical element being configured to transmit a part of the first light and reflect another part of the first light, a wavelength conversion element which one of the part of the first light and the another part of the first light enters, the wavelength conversion element being configured to emit a second light having a second wavelength band different from the first wavelength band, a diffusion element which the other of the part of the first light and the another part of the first light enters, the diffusion element being configured to diffuse the first light, and a second optical element configured to combine the second light emitted from the wavelength conversion element and the first light emitted from the diffusion element. The wavelength conversion element includes a wavelength conversion layer having a light incident surface, the wavelength conversion layer being configured to convert the first light which is incident on the light incident surface into the second light, a substrate having a support surface configured to support the wavelength conversion layer, a first optical member having a first optical layer configured to transmit the first light and reflect the second light, the first optical layer facing the support surface, a second optical member having a second optical layer configured to reflect the second light, the second optical layer crossing the support surface and the first optical layer, and a third optical member having a third optical layer configured to reflect the second light, the third optical layer crossing the support surface and the first optical layer and facing the second optical layer. An opening is formed by the substrate, the first optical member, the second optical member, and the third optical member. A first area of the light incident surface of the wavelength conversion layer is larger than a second area of a light incident area on which the first light is incident in the light incident surface. The second area of the light incident area is larger than a third area of the opening. The second light is emitted from the opening.

According to a fourth aspect of the present disclosure, a projector includes the light source device according to the second or third aspect of the present disclosure, a light modulation device configured to modulate light emitted from the light source device, and a projection optical device configured to project the light modulated by the light modulation device.

DESCRIPTION OF EXEMPLARY EMBODIMENTS

Some embodiments of the present disclosure will hereinafter be described in detail with reference to the drawings.

It should be noted that the drawings used in the following description show characteristic parts in an enlarged manner in some cases for the sake of convenience in order to make the features easy to understand, and the dimensional ratios between the constituents and so on are not necessarily the same as actual ones.

An example of a projector according to the present embodiment will be described.

Figure 1:
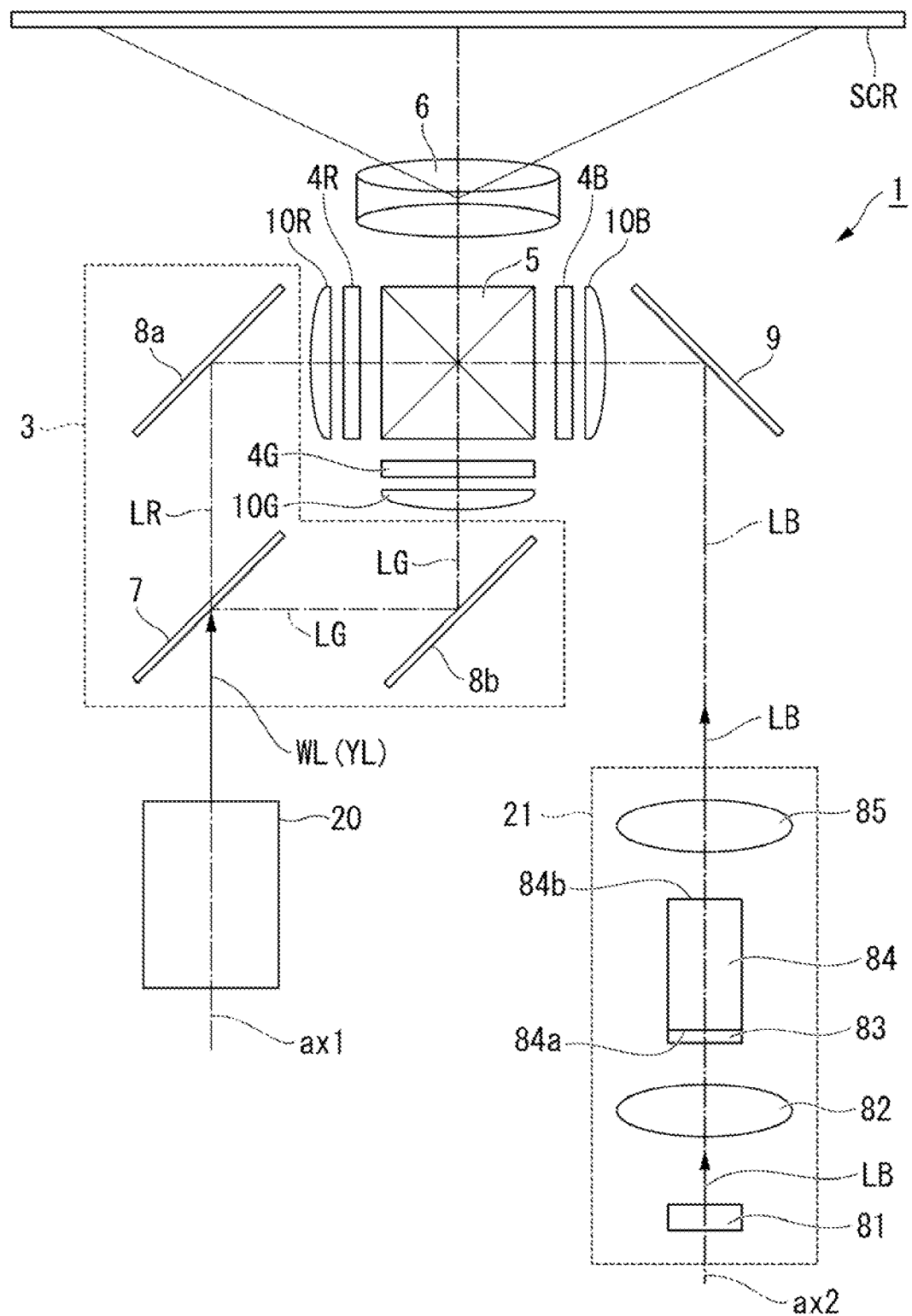
FIG. 1 is a diagram showing a schematic configuration of a projector according to a first embodiment.

FIG. 1 is a diagram showing a schematic configuration of the projector according to the present embodiment.

As shown in FIG. 1, the projector 1 according to the present embodiment is a projection-type image display device for displaying a color image on a screen SCR. The projector 1 is provided with a color separation optical system 3, a light modulation device 4R, a light modulation device 4G, a light modulation device 4B, a combining optical system 5, a projection optical device 6, a first light source device (a light source device) 20, and a second light source device 21. It should be noted that the first light source device 20 corresponds to an embodiment the light source device according to the present disclosure.

The color separation optical system 3 separates illumination light WL having a yellow color into red light LR and green light LG. The color separation optical system 3 is provided with a color separation mirror 7, a first reflecting mirror 8a, and a second reflecting mirror 8b.

The color separation mirror 7 is formed of a dichroic mirror for separating the illumination light WL from the first light source device 20 into the red light LR and the green light LG. The color separation mirror 7 transmits the red light LR, and at the same time reflects the green light LG out of the illumination light WL. The second reflecting mirror 8b reflects the green light LG toward the light modulation device 4G. The first reflecting mirror 8a is disposed in a light path of the red light LR, and the red light LR which has been transmitted through the color separation mirror 7 is reflected by the first reflecting mirror 8a toward the light modulation device 4R.

In contrast, the blue light LB from the second light source device 21 is reflected by a reflecting mirror 9 toward the light modulation device 4B.

Here, a configuration of the second light source device 21 will be described.

The second light source device 21 has a second light source 81, a light collection lens 82, a diffuser plate 83, a rod lens 84, and a relay lens 85. The second light source 81 is formed of at least one semiconductor laser, and emits the blue light BL consisting of a laser beam. It should be noted that the second light source 81 is not limited to the semiconductor layer, but can also be an LED for emitting blue light.

The light collection lens 82 is formed of a convex lens, and makes the blue light LB enter the diffuser plate 83 in a substantially converged state. The diffuser plate 83 diffuses the blue light LB from the second light source 81 with a predetermined degree of diffusion to thereby generate the blue light LB having a light distribution similar to the light distribution of the illumination light WL consisting of fluorescence YL having been emitted from the first light source device 20. As the diffuser plate 83, there can be used, for example, obscured glass made of optical glass.

The blue light LB diffused by the diffuser plate 83 enters the rod lens 84. The rod lens 84 has a prismatic shape extending along a direction of an illumination light axis ax2 of the second light source device 21, and has an end surface of incidence 84a disposed at one end, and an exit end surface 84b disposed at the other end. The diffuser plate 83 is fixed to the end surface of incidence 84a of the rod lens 84 via an optical adhesive not shown. It is desirable to make the refractive index of the diffuser plate 83 and the refractive index of the rod lens 84 coincide with each other as precise as possible.

The blue light LB is emitted from the exit end surface 84b in the state in which homogeneity of the illuminance distribution is enhanced by propagating through the rod lens 84 with total reflection. The blue light LB emitted from the rod lens 84 enters the relay lens 85. The relay lens 85 makes the blue light LB enhanced in homogeneity of the illuminance distribution by the rod lens enter the reflecting mirror 9.

The shape of the exit end surface 84b of the rod lens 84 is a rectangular shape substantially similar to the shape of an image formation area of the light modulation device 4B. Thus, the blue light LB emitted from the rod lens 84 efficiently enters the image formation area of the light modulation device 4B.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are respectively disposed polarization plates not shown, and thus, there is formed a configuration of transmitting only the linearly-polarized light having a specific direction.

At the incident side of the light modulation device 4R, the light modulation device 4G, and the light modulation device 4B, there are disposed a field lens 10R, a field lens 10G, and a field lens 10B, respectively. The field lens 10R, the field lens 10G, and the field lens 10B collimate principal rays of the red light LR, the green light LG, and the blue light LB which enter the light modulation device 4R, the light modulation device 4G, and the light modulation device 4B, respectively.

The combining optical system 5 combines the image light corresponding to the red light LR, the image light corresponding to the green light LG, and the image light corresponding to the blue light LB with each other in response to incidence of the image light respectively emitted from the light modulation device 4R, the light modulation device 4G, and the light modulation device 4B, and then emits the image light thus synthesized toward the projection optical device 6. As the combining optical system 5, there is used, for example, a cross dichroic prism.

The projection optical device 6 is constituted by a plurality of lenses. The projection optical device 6 projects the image light having been synthesized by the combining optical system 5 toward the screen SCR in an enlarged manner. Thus, an image is displayed on the screen SCR.

First Light Source Device

Figure 2:
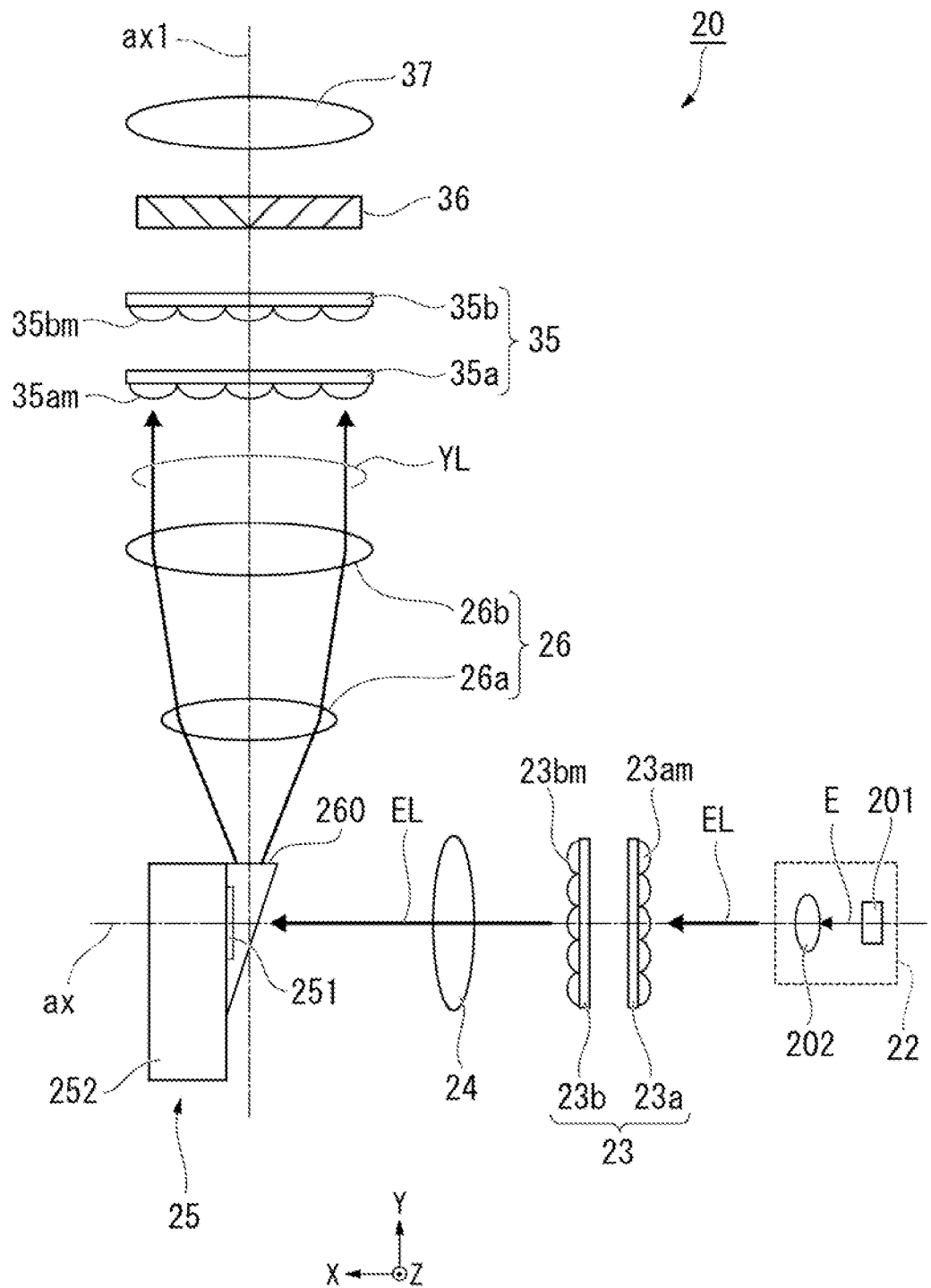
FIG. 2 is a schematic configuration diagram of a first light source device.

FIG. 2 is a schematic configuration diagram of the first light source device 20.

In the following drawings including FIG. 2, constituents of the first light source device 20 will be described using an XYZ coordinate system as needed. The X axis is an axis parallel to an optical axis ax of a light source 22, the Y axis is an axis parallel to an illumination axis ax1 perpendicular to the optical axis ax, and the Z axis is an axis perpendicular to each of the X axis and the Y axis. In other words, the optical axis ax and the illumination light axis ax1 are located in the same plane, and the optical axis ax is perpendicular to the illumination light axis ax1.

As shown in FIG. 2, the first light source device 20 is provided with the light source 22, a homogenizer optical system 23, a light collection optical system 24, a wavelength conversion element 25, a pickup optical system 26, an integrator optical system 35, a polarization conversion element 36, and a superimposing lens 37.

The light source 22 includes a light emitting section 201 and a collimating lens 202. The light emitting section 201 is formed of a semiconductor laser. The light emitting section 201 emits a ray E consisting of a light beam having a peak wavelength of, for example, 445 nm. It should be noted that it is also possible to use a semiconductor laser for emitting the ray E having a wavelength other than 445 nm as the light emitting section 201. For example, it is possible for the light emitting section 201 to emit a ray E consisting of a light beam having a peak wavelength of 460 nm.

The collimating lens 202 is arranged so as to correspond to the light emitting section 201. The collimating lens 202 converts the ray E emitted from the light emitting section 201 into parallel light. It should be noted that the number of the light emitting sections 201 and the collimating lenses 202 is not particularly limited.

In such a manner, the light source 22 emits excitation light (light in a first wavelength band) EL as a parallel pencil having a blue wavelength band (the first wavelength band).

In the first light source device 20 according to the present embodiment, on the optical axis ax of the light source 22, there are disposed the light source 22, the homogenizer optical system 23, the light collection optical system. 24, and the wavelength conversion element 25.

The excitation light EL emitted from the light source 22 enters the homogenizer optical system 23. The homogenizer optical system 23 is constituted by, for example, a lens array 23a and a lens array 23b. The lens array 23a includes a plurality of small lenses 23am, and the lens array 23b includes a plurality of small lenses 23bm.

The lens array 23a separates the excitation light EL into a plurality of small pencils. The small lenses 23am of the lens array 23a form images of the small pencils on the corresponding small lenses 23bm of the lens array 23b, respectively. The lens array 23b superimposes the images of the small lenses 23am of the lens array 23a on a phosphor layer 251 of the wavelength conversion element 25 together with the light collection optical system 24 described later. The light collection optical system 24 homogenizes the illuminance distribution of the excitation light EL which enters a surface of the phosphor layer 251 of the wavelength conversion element 25 in cooperation with the homogenizer optical system 23. It should be noted that the light collection optical system 24 is constituted by a single lens or a plurality of lenses.

The wavelength conversion element 25 has the phosphor layer 251 which is excited by the excitation light EL entering the phosphor layer 251 from the light source 22 toward the +X side to thereby generate the fluorescence YL, and a substrate 252 for supporting the phosphor layer 251. The wavelength conversion element 25 emits the fluorescence YL thus generated from an opening part 260 toward the +Y side. It should be noted that the details of the configuration of the wavelength conversion element 25 will be described later.

The pickup optical system 26 is constituted by, for example, pickup lenses 26a, 26b. The pickup optical system 26 has a function of picking up and then collimating the fluorescence YL emitted from the phosphor layer 251.

The fluorescence YL enters the integrator optical system 35. The integrator optical system 35 is constituted by, for example, a first lens array 35a and a second lens array 35b. The first lens array 35a includes a plurality of first small lenses 35am, and the second lens array 35b includes a plurality of second small lenses 35bm.

The first lens array 35a separates the fluorescence YL into a plurality of small pencils. The first small lenses 35am form images of the small pencils on the corresponding second small lenses 35bm, respectively. The integrator optical system 35 cooperates with the superimposing lens 37 described later to thereby homogenize the illuminance distribution of each of the image formation areas of the light modulation devices 4R, 4G shown in FIG. 1 as the illumination target areas.

The fluorescence YL having passed through the integrator optical system 35 enters the polarization conversion element 36. The polarization conversion element 36 is constituted by, for example, a polarization separation film and a retardation plate (a ½ wave plate). The polarization conversion element 36 converts the polarization direction in the fluorescence YL into one polarization component.

The fluorescence YL having passed through the polarization conversion element 36 enters the superimposing lens 37. The fluorescence YL having been emitted from the superimposing lens 37 enters the color separation optical system 3. The superimposing lens 37 superimposes the plurality of small pencils described above forming the fluorescence YL on each other in the illumination target areas, namely the image formation areas, of the light modulation devices 4R, 4G to thereby homogenously illuminate the image formation areas.

Figure 3:
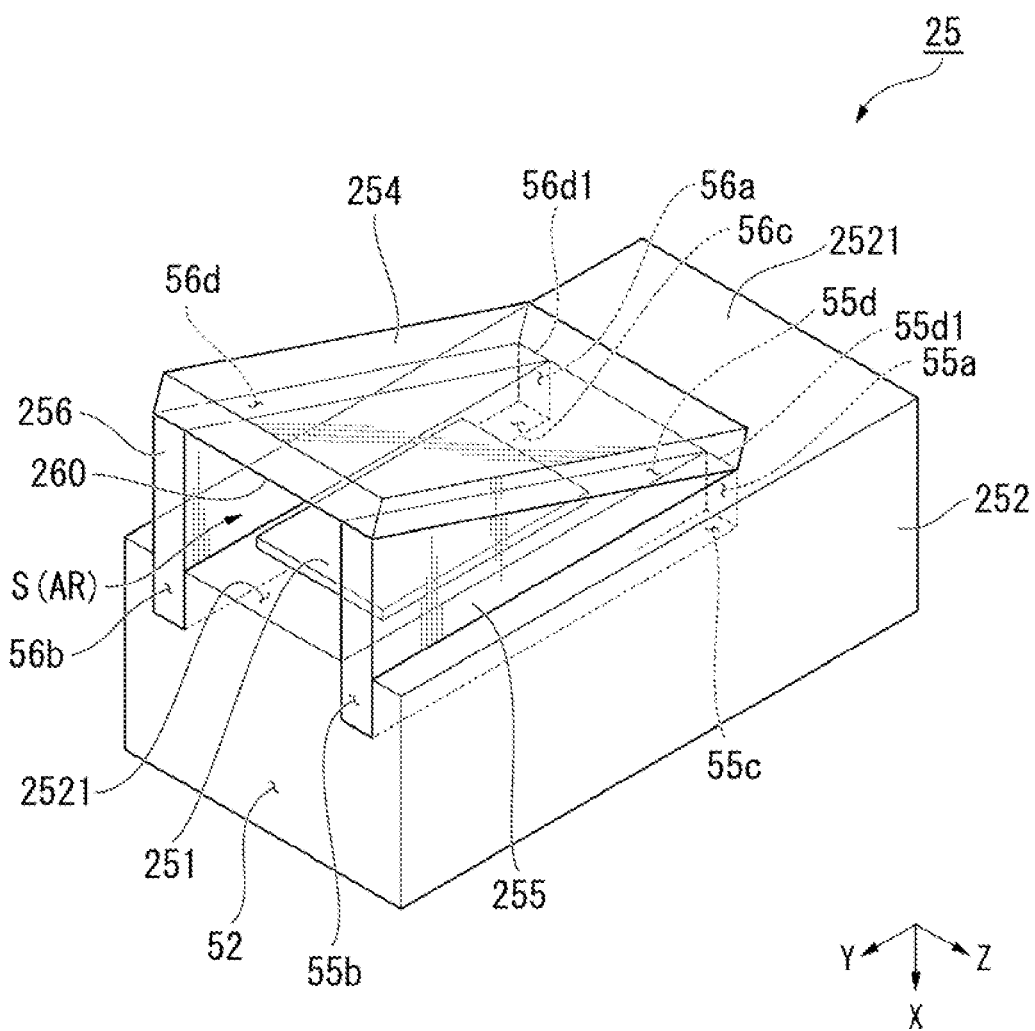
FIG. 3 is a perspective view showing a schematic configuration of a wavelength conversion element.
Figure 4:
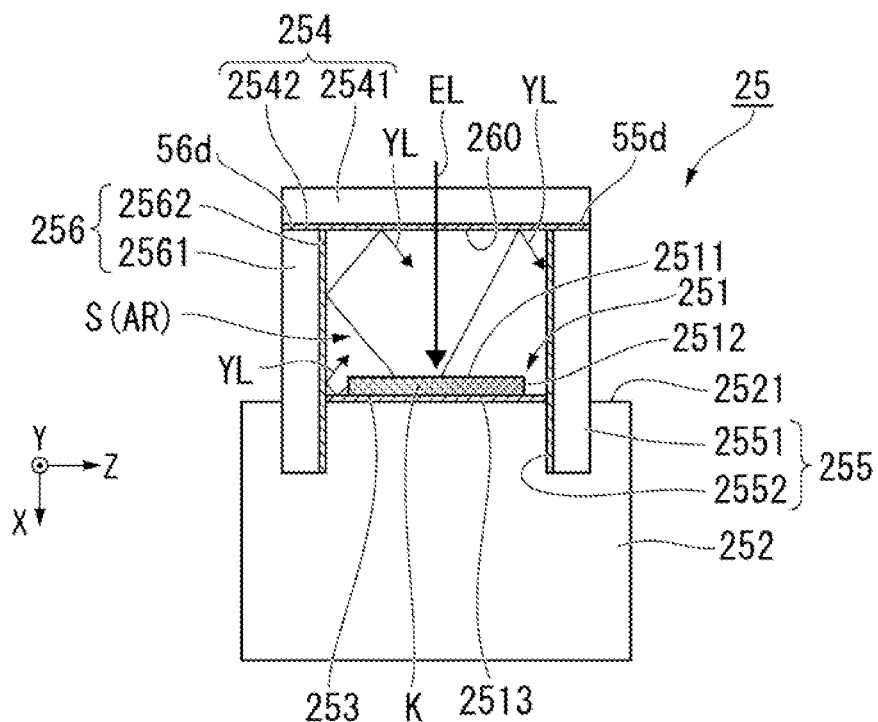
FIG. 4 is a front view of the wavelength conversion element viewed from a +Y side.
Figure 5:
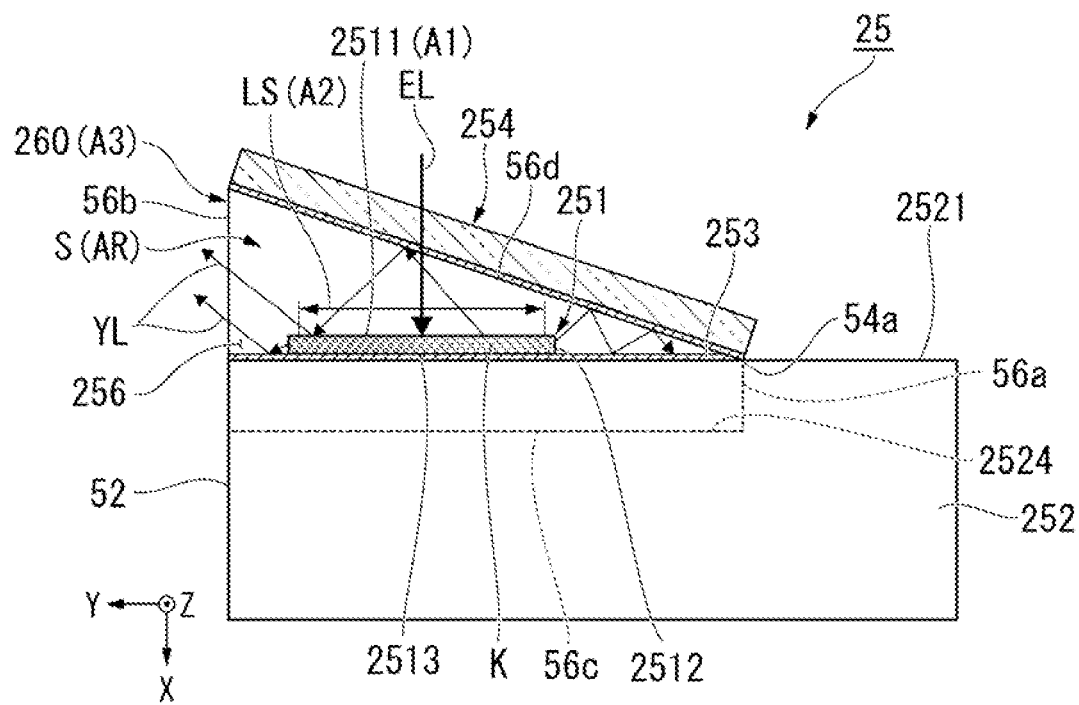
FIG. 5 is a cross-sectional view of the wavelength conversion element.

Subsequently, a configuration of the wavelength conversion element 25 will be described. FIG. 3 is a perspective view showing a schematic configuration of the wavelength conversion element 25. FIG. 4 is a front view of the wavelength conversion element 25 viewed from the +Y side. FIG. 5 is a cross-sectional view of the wavelength conversion element 25. It should be noted that FIG. 5 is a cross-sectional view with a plane along the X-Y plane.

As shown in FIG. 3 through FIG. 5, the wavelength conversion element 25 in the present embodiment is provided with the phosphor layer (the wavelength conversion layer) 251, the substrate 252, a fourth optical layer 253, a first optical member 254, a second optical member 255, and a third optical member 256. The wavelength conversion element 25 is provided with the opening part 260 for emitting the fluorescence YL generated in the phosphor layer 251. The opening part 260 is disposed at the +Y side of the wavelength conversion element 25.

The opening part 260 in the present embodiment is an opening formed by end surfaces at the +Y side of the substrate 252, the first optical member 254, the second optical member 255, and the third optical member 256.

The phosphor layer 251 includes phosphor particles which are excited by the excitation light EL to emit the fluorescence (light in a second wavelength band) YL in a yellow wavelength band (the second wavelength band). The phosphor layer 251 performs the wavelength conversion on the excitation light EL to thereby generate the fluorescence YL.

The phosphor layer 251 is a phosphor shaped like a plate including an obverse surface (a plane of incidence of light) 2511, side surfaces 2512, and a reverse surface 2513. The obverse surface 2511 is a surface which the excitation light EL enters. The side surfaces 2512 are surfaces crossing the obverse surface 2511. The side surfaces 2512 can be perpendicular to the obverse surface 2511. The reverse surface 2513 is an opposite surface to the obverse surface 2511.

As the phosphor particles, there can be used, for example, a YAG (yttrium aluminum garnet) based phosphor. It should be noted that the constituent material of the phosphor particles can be unique, or it is also possible to use a mixture of the particles formed using two or more types of materials as the phosphor particles. As the phosphor layer 251, it is possible to use, for example, a phosphor layer obtained by dispersing the phosphor particles in an inorganic binder such as alumina, or a phosphor layer obtained by sintering the phosphor particles without using the binder. The phosphor layer 251 in the present embodiment includes a plurality of air holes (scattering bodies) K.

The phosphor layer 251 is supported by the substrate 252. The substrate 252 includes a support surface 2521 for supporting the phosphor layer 251. The support surface 2521 is a surface parallel to the Y-Z plane. The substrate 252 is thermally coupled to the phosphor layer 251. The substrate 252 is a metal plate excellent in radiation performance made of, for example, aluminum or copper. The substrate 252 is thermally coupled to the phosphor layer 251, and therefore, radiates the heat of the phosphor layer 251 to thereby cool the phosphor layer 251.

In the wavelength conversion element 25, the phosphor layer 251 is housed in a housing space S. The housing space S is a space surrounded by the substrate 252, the first optical member 254, the second optical member 255, and the third optical member 256. The housing space S is disposed inside the opening part 260. In the case of the present embodiment, the housing space S is opened to the air. In other words, the housing space S is provided with an air layer AR.

The fourth optical layer 253 is disposed between the substrate 252 and the phosphor layer 251. The area of the fourth optical layer 253 is larger than the area of the reverse surface 2513 of the phosphor layer 251. In the case of the present embodiment, the fourth optical layer 253 is disposed on the support surface 2521 located in the housing space S. In other words, the fourth optical layer 253 is disposed on the periphery of the phosphor layer 251 in the support surface 2521 of the substrate 252. The phosphor layer 251 is bonded to the support surface 2521 of the substrate 252 via the fourth optical layer 253. The fourth optical layer 253 is formed of, for example, a metal layer or a dielectric layer. It should be noted that the fourth optical layer 253 can be disposed in the entire area of the support surface 2521, namely to the outside of the housing space S. Further, a part of the fourth optical layer 253 can directly formed on the reverse surface 2513 of the phosphor layer 251.

The first optical member 254 is arranged so as to be opposed to the support surface 2521 of the substrate 252. In other words, the first optical member 254 is arranged so as to be opposed to the obverse surface 2511 of the phosphor layer 251. The first optical member 254 is arranged so as not to have contact with the phosphor layer 251.

The first optical member 254 is disposed in a state of being tilted with respect to the obverse surface 2511 of the phosphor layer 251. An angle formed between the first optical member 254 and the obverse surface 2511 of the phosphor layer 251 is set to be an acute angle.

The first optical member 254 includes a light transmissive substrate 2541 and a first optical layer 2542. The light transmissive substrate 2541 is formed of, for example, glass. The first optical layer 2542 is disposed on an inner surface of the light transmissive substrate 2541, namely a surface opposed to the phosphor layer 251. The first optical layer 2542 has a characteristic of transmitting the excitation light EL and reflecting the fluorescence YL. The first optical layer 2542 is opposed to the support surface 2521 of the substrate 252.

Thus, it is possible for the first optical member 254 to reflect the fluorescence YL generated in the phosphor layer 251 while transmitting the excitation light EL emitted from the light source 22.

The second optical member 255 includes abase member 2551 and a second optical layer 2552. As a constituent material of the base member 2551, there is used, for example, glass. The second optical layer 2552 is formed on an inner surface of the base member 2551. The second optical layer 2552 is formed of, for example, a metal layer or a dielectric layer.

The second optical member 255 is arranged so as to cross the support surface 2521 of the substrate 252, and the first optical member 254. The second optical member 255 is arranged so that the second optical layer 2552 crosses the support surface 2521 and the first optical layer 2542. The second optical member 255 can be perpendicular to the support surface 2521 of the substrate 252, and the first optical member 254. The second optical layer 2552 can be perpendicular to the support surface 2521 and the first optical layer 2542. The second optical member 255 is arranged so that the thickness direction thereof coincides with the Z-axis direction. The second optical member 255 is disposed at the +Z side in the vicinity of the phosphor layer 251. Therefore, a part of the fluorescence YL which has been emitted from the phosphor layer 251 toward the +Z side is reflected by the second optical member 255.

It should be noted that even when, for example, the excitation light EL has entered the second optical member 255 for some reason, the second optical member 255 reflects the excitation light EL to enter the phosphor layer 251.

The second optical member 255 is a plate having a trapezoidal shape.

As shown in FIG. 3, the second optical member 255 includes a first end surface 55a, a second end surface 55b, a third end surface 55c, and a fourth end surface 55d, wherein the first end surface 55a forms an upper base of the trapezoidal shape, the second end surface 55b forms a lower base of the trapezoidal shape, the third end surface 55c couples the first end surface 55a and the second end surface 55b to each other at the +X side, and the fourth end surface 55d couples the first end surface 55a and the second end surface 55b to each other at the −X side. It should be noted that the first end surface 55a, the second end surface 55b, the third end surface 55c, and the fourth end surface 55d are all flat surfaces. The third end surface 55c is a surface opposed to the substrate 252. The fourth end surface 55d is a surface at the opposite side to the third end surface 55c in the base member 2551. The first optical member 254 has contact with the fourth end surface 55d. The first optical member 254 is mounted on the fourth end surface 55d. The first optical layer 2542 has contact with the fourth end surface 55d. The light transmissive substrate 2541 is mounted on the fourth end surface 55d via the first optical layer 2542.

Here, when glass is used as the material of the base member 2551, a chamfering process for removing sharp portions to thereby prevent chips becomes necessary. In the present embodiment, the second optical member 255 is provided with the trapezoidal plate shape to thereby make the chamfering process unnecessary, and thus, the workability of the base member 2551 is improved.

In the case of the present embodiment, a part of the second optical member 255 is embedded in the substrate 252. Therefore, the second optical member 255 is firmly supported by the substrate 252.

A part of an end portion at the +X side in the second optical member 255 is fitted in a groove 2524 provided to the support surface 2521 of the substrate 252. It should be noted that it is possible to fill a gap between the second optical member 255 and the groove 2524 with an adhesive.

Specifically, in the second optical member 255, the whole of the first end surface 55a and the third end surface 55c are fitted in the groove 2524. An end side 55d1, which is located at the −Y extreme side of the fourth end surface 55d, and extends along the Z direction, is made coplanar with the support surface 2521 of the substrate 252. Thus, the fourth end surface 55d and the support surface 2521 of the substrate 252 are smoothly connected to each other. Further, at the +Y side, the second end surface 55b is made coplanar with an end surface 52 of the substrate 252.

The third optical member 256 has substantially the same configuration as that of the second optical member 255.

Specifically, the third optical member 256 includes a base member 2561 and a third optical layer 2562. The third optical layer 2562 is formed on an inner surface of the base member 2561. The third optical layer 2562 is formed of, for example, a metal layer or a dielectric layer.

The third optical member 256 is arranged so as to cross the support surface 2521 of the substrate 252, and the first optical member 254, and so as to be opposed to the second optical member 255. The third optical member 256 is arranged so that the third optical layer 2562 to crosses the support surface 2521 and the first optical layer 2542, and is opposed to the second optical layer 2552. The third optical member 256 can be perpendicular to the support surface 2521 of the substrate 252, and the first optical member 254.

The third optical layer 2562 can be perpendicular to the support surface 2521 and the first optical layer 2542. The third optical member 256 is arranged so that the thickness direction thereof coincides with the Z-axis direction. The third optical member 256 is disposed at the −Z side in the vicinity of the phosphor layer 251. Therefore, the fluorescence YL which has been emitted from the phosphor layer 251 toward the −Z side and then entered the third optical member 256 is reflected by the third optical member 256. It should be noted that even when, for example, the excitation light EL has entered the third optical member 256 for some reason, the third optical member 256 reflects the excitation light EL to enter the phosphor layer 251.

The third optical member 256 is a plate having substantially the same trapezoidal shape as that of the second optical member 255.

The third optical member 256 includes a first end surface 56a, a second end surface 56b, a third end surface 56c, and a fourth end surface 56d, wherein the first end surface 56a forms an upper base of the trapezoidal shape, the second end surface 56b forms a lower base of the trapezoidal shape, the third end surface 56c couples the first end surface 56a and the second end surface 56b to each other at the +X side, and the fourth end surface 56d couples the first end surface 56a and the second end surface 56b to each other at the −X side. It should be noted that the first end surface 56a, the second end surface 56b, the third end surface 56c, and the fourth end surface 56d are all flat surfaces. The third end surface 56c is a surface opposed to the substrate 252. The fourth end surface 56d is a surface at the opposite side to the third end surface 56c in the base member 2561. The first optical member 254 has contact with the fourth end surface 56d. The first optical member 254 is mounted on the fourth end surface 56d. The first optical layer 2542 has contact with the fourth end surface 56d. The light transmissive substrate 2541 is mounted on the fourth end surface 56d via the first optical layer 2542.

In the case of the present embodiment, a part of the third optical member 256 is embedded in the substrate 252, and thus, the third optical member 256 is firmly supported by the substrate 252.

A part of an end portion at the +X side in the third optical member 256 is fitted in another groove 2524 provided to the support surface 2521 of the substrate 252. It is possible to fill a gap between the third optical member 256 and the groove 2524 with an adhesive.

Specifically, in the third optical member 256, the whole of the first end surface 56a and the third end surface 56c are fitted in the groove 2524. An end side 56d1, which is located at the −Y extreme side of the fourth end surface 56d, and extends along the Z direction, is made coplanar with the support surface 2521 of the substrate 252. Thus, the fourth end surface 56d and the support surface 2521 of the substrate 252 are smoothly connected to each other. Further, at the +Y side, the second end surface 56b is made coplanar with the end surface 52 of the substrate 252.

In the present embodiment, the first optical member 254 is supported by the second optical member 255 and the third optical member 256. The first optical member 254 is fixedly bonded to the second optical member 255 and the third optical member 256.

Specifically, the first optical member 254 is disposed so as to bridge the fourth end surface 55d of the second optical member 255 and the fourth end surface 56d of the third optical member 256 with each other. At the −Y side, an inner end side 54a of the first optical member 254 has contact with the support surface 2521 of the substrate 252.

Based on such a configuration, in the wavelength conversion element 25 according to the present embodiment, the −Y side as an opposite side to the opening part 260 is closed by the substrate 252, the first optical member 254, the second optical member 255, and the third optical member 256. Therefore, it becomes possible for the wavelength conversion element 25 to prevent the leakage of the fluorescence YL from the opposite side to the opening part 260 to thereby efficiently emit the fluorescence YL from the opening part 260.

As shown in FIG. 4 and FIG. 5, the excitation light EL is transmitted through the first optical member 254 to enter the phosphor layer 251. The excitation light EL enters the phosphor layer 251 so as to be converged on the obverse surface 2511 by the light collection optical system 24. On the obverse surface 2511 of the phosphor layer 251, there is formed an excitation light incident region LS. The excitation light incident region LS corresponds to an irradiation spot formed by the excitation light EL on the obverse surface 2511.

The phosphor layer 251 is excited by the excitation light EL having entered the excitation light incident region LS, and emits the fluorescence YL with Lambertian emission. It should be noted that the area of the region where the fluorescence YL is emitted is larger than the area of the excitation light incident region LS.

The fluorescence YL emitted from the phosphor layer 251 as the Lambertian emission. For example, a part of the fluorescence YL as the Lambertian emission from the obverse surface 2511 enters the first optical member 254 arranged so as to be opposed to the obverse surface 2511. The fluorescence YL having entered the first optical member 254 is reflected by the first optical layer 2542. A part of the fluorescence YL having been reflected by the first optical layer 2542 is directly emitted from the opening part 260.

Further, a part of the fluorescence YL having been reflected by the first optical layer 2542 enters the support surface 2521 of the substrate 252, and is then reflected by the fourth optical layer 253 formed on the support surface 2521. The fluorescence YL having been reflected by the fourth optical layer 253 is emitted from the opening part 260, or enters the first optical member 254 once again and is then reflected.

It should be noted that a part of the fluorescence YL having been reflected by the first optical layer 2542 is returned to the inside of the phosphor layer 251. The phosphor layer 251 in the present embodiment includes a plurality of air holes K. Therefore, the fluorescence YL having been returned to the inside of the phosphor layer 251 is scattered by the air holes K to thereby emitted again from the phosphor layer 251 with the Lambertian emission.

Further, a part of the fluorescence YL having been emitted with the Lambertian emission from the side surfaces 2512 of the phosphor layer 251 enters the second optical member 255 or the third optical member 256 via the fourth optical layer 253, or directly enters the second optical member 255 or the third optical member 256. The fluorescence YL is reflected by the second optical member 255 or the third optical member 256 to thereby enter the first optical member 254 once again to be reflected.

It should be noted that a part of the fluorescence YL having been generated in the phosphor layer 251 propagates toward an opposite direction (−Y side) to the opening part 260, but is eventually emitted from the opening part 260 by being repeatedly reflected.

In such a manner, in the wavelength conversion element 25 according to the present embodiment, the fluorescence YL generated in the phosphor layer 251 can be emitted toward the +Y side from the opening part 260.

In the wavelength conversion element 25 according to the present embodiment, in the phosphor layer 251, the closer to the −Y side as the opposite side to the opening part 260, the more apt to be confined the heat is, and the higher the temperature becomes, compared to the opening part 260 side from which the fluorescence YL is emitted. In contrast, in the wavelength conversion element 25 according to the present embodiment, there is adopted the shape elongated toward the opposite side to the opening part 260 as the shape of the substrate 252 for supporting the phosphor layer 251 as shown in FIG. 3 and FIG. 5. Therefore, according to the wavelength conversion element 25 related to the present embodiment, it is possible to efficiently cool the opposite side to the opening part 260 where the heat is apt to be confined in the phosphor layer 251. Therefore, it is possible to efficiently cool the phosphor layer 251.

In the wavelength conversion element 25 according to the present embodiment, the area A1 of the obverse surface 2511 of the phosphor layer 251 is made larger than the area A2 of the excitation light incident region LS. Further, in the wavelength conversion element 25 according to the present embodiment, by setting the angle formed between a plane along the first optical layer 2542 of the first optical member 254 and a plane along the obverse surface 2511 to no smaller than 10° and no larger than 40°, the area A3 of the opening part 260 is made smaller than the area A2 of the excitation light incident region LS.

In other words, in the wavelength conversion element 25 according to the present embodiment, the area A1 of the obverse surface 2511 of the phosphor layer 251 is made larger than the area A2 of the excitation light incident region LS, and the area A2 of the excitation light incident region LS is made larger than the area A3 of the opening part 260. In the wavelength conversion element 25 according to the present embodiment, since the opening part 260 can be assumed as an apparent light emitting surface of the fluorescence YL, it is possible to assume the area A3 of the opening part 260 as an apparent light emission area of the fluorescence YL.

Advantages of First Embodiment

According to the wavelength conversion element 25 related to the present embodiment described hereinabove, the following advantages are exerted.

The wavelength conversion element 25 according to the present embodiment is provided with the phosphor layer 251 which has a plane of incidence of light, and performs the wavelength conversion on the excitation light EL in the first wavelength band having entered the plane of incidence of light to generate the fluorescence YL in the second wavelength band different from the first wavelength band, the substrate 252 having the support surface 2521 configured to support the phosphor layer 251, the first optical member 254 which has the first optical layer 2542 configured to transmit the excitation light EL and reflect the fluorescence YL, and in which the first optical layer 2542 is arranged so as to be opposed to the support surface 2521, the second optical member 255 which has the second optical layer 2552 configured to reflect at least the fluorescence YL, and in which the second optical layer 2552 is arranged so as to cross the support surface 2521 and the first optical layer 2542, the third optical member 256 which has the third optical layer 2562 configured to reflect at least the fluorescence YL, and in which the third optical layer 2562 is arranged so as to cross the support surface 2521 and the first optical layer 2542, and so as to be opposed to the second optical layer 2552, and the opening part 260 constituted by the substrate 252, the first optical member 254, the second optical member 255, and the third optical member 256. The area A1 of the obverse surface 2511 of the phosphor layer 251 is larger than the area A2 of the excitation light incident region LS which the excitation light EL enters in the obverse surface 2511, the area A2 of the excitation light incident region LS is larger than the area A3 of the opening part 260, and the fluorescence YL is emitted from the opening part 260.

According to the wavelength conversion element 25 related to the present embodiment, since the fluorescence YL is emitted from the opening part 260 smaller in area than the excitation light incident region LS which the excitation light EL is made to enter, the apparent light emission area of the fluorescence YL becomes smaller compared to a configuration in which the fluorescence YL is directly taken out from the excitation light incident region LS. Thus, it is possible to reduce the etendue in the fluorescence YL. Further, in the wavelength conversion element 25 according to the present embodiment, since it is possible to reduce the etendue without reducing the incident area of the excitation light EL on the phosphor layer 251, the light density of the excitation light EL does not become high in the obverse surface 2511 of the phosphor layer 251. Therefore, it is possible to prevent a decrease in fluorescence conversion efficiency due to the increase in light density.

Therefore, according to the wavelength conversion element 25 related to the present embodiment, it is possible to reduce the etendue while preventing the increase in light density of the excitation light EL.

In the wavelength conversion element 25 according to the present embodiment, the phosphor layer 251 includes the air holes K configured to scatter light.

According to this configuration, since the fluorescence YL having reentered the phosphor layer 251 is diffused inside, it is possible to emit the fluorescence YL having reentered the phosphor layer 251 with the Lambertian emission.

In the wavelength conversion element 25 according to the present embodiment, the angle of the first optical member 254 formed with respect to the obverse surface 2511 of the phosphor layer 251 is no smaller than 10° and no larger than 40°.

According to this configuration, by making the first optical member 254 closer to the obverse surface 2511 of the phosphor layer 251, it is possible to realize the configuration in which the area A3 of the opening part 260 is made smaller than the area A2 of the excitation light incident region LS.

In the wavelength conversion element 25 according to the present embodiment, the second optical member 255 includes the second optical layer 2552 configured to reflect the excitation light EL and the fluorescence YL, and the third optical member 256 includes the third optical layer 2562 configured to reflect the excitation light EL and the fluorescence YL.

According to this configuration, it is possible to reflect the fluorescence YL having been emitted from the side surfaces 2512 of the phosphor layer 251 to return the fluorescence YL to the phosphor layer 251. Further, it is possible to reflect the excitation light EL to make the excitation light EL enter the phosphor layer 251. Thus, it is possible to improve the use efficiency of the excitation light EL and the fluorescence YL.

In the wavelength conversion element 25 according to the present embodiment, there is further provided the fourth optical layer 253 disposed between the substrate 252 and the phosphor layer 251.

According to this configuration, by reflecting the fluorescence YL proceeding in the phosphor layer 251 toward the substrate 252, it is possible to emit the fluorescence YL proceeding in the phosphor layer 251 toward the substrate 252 from the obverse surface 2511. Thus, it is possible to increase the light use efficiency of the fluorescence YL.

In the wavelength conversion element 25 according to the present embodiment, the fourth optical layer 253 is disposed in at least a part of the periphery of the phosphor layer 251 in the support surface 2521 of the substrate 252.

According to this configuration, it is possible to reflect the fluorescence YL having been emitted from the side surfaces 2512 of the phosphor layer 251 to return the fluorescence YL to the phosphor layer 251. Further, the fluorescence YL having been emitted from the side surfaces 2512 of the phosphor layer 251 is reflected to be emitted from the phosphor layer 260. Therefore, it is possible to increase the light use efficiency of the fluorescence YL.

In the wavelength conversion element 25 according to the present embodiment, the first optical member 254 is arranged so as not to have contact with the phosphor layer 251.

According to this configuration, since the first optical member 254 does not make contact with the phosphor layer 251, it is possible to prevent the deformation and the breakage of the first optical member 254 due to the heat of the phosphor layer 251.

In the wavelength conversion element 25 according to the present embodiment, the first optical member 254 includes the first optical layer 2542 configured to transmit the excitation light EL and at the same time reflect the fluorescence YL.

According to this configuration, it is possible to realize the configuration in which the phosphor layer 251 housed in the housing space S is efficiently excited, and the fluorescence YL thus generated is reflected and is then taken out from the opening part 260.

In the wavelength conversion element 25 according to the present embodiment, the phosphor layer 251 is housed in the housing space S disposed inside the opening part 260, and the air layer AR is disposed in the housing space S.

Here, when the housing space S is filled with a prism material such as glass, light is totally reflected by a prism exit surface not to thereby be efficiently emitted outside the opening part 260 from the inside of the housing space S. In contrast, according to the configuration of the present embodiment, since the housing space S is filled with the air layer AR, it is possible to emit the fluorescence YL from the opening part 260 in good condition.

In the wavelength conversion element 25 according to the present embodiment, a part of the second optical member 255 and a part of the third optical member 256 are each embedded in the substrate 252.

According to this configuration, the second optical member 255 and the third optical member 256 can stably be supported by the substrate 252.

According to the first light source device 20 related to the present embodiment described hereinabove, the following advantages are exerted.

The first light source device 20 according to the present embodiment is provided with the light source 22 configured to emit the excitation light EL, and the wavelength conversion element 25.

Due to this fact, according to the first light source device 20 related to the present embodiment, since there is provided the wavelength conversion element 25 in which the etendue is made small while preventing the decrease in the fluorescence conversion efficiency due to the increase in light density of the excitation light EL, it is possible to generate the fluorescence YL high in luminance.

According to the projector 1 related to the present embodiment described hereinabove, the following advantages are exerted.

The projector 1 according to the present embodiment is provided with the first light source device 20, the second light source device 21, the light modulation devices 4B, 4G, and 4R, and the projection optical device 6, wherein the light modulation devices 4B, 4G, and 4R modulate the blue light LB, the green light LG, and the red light LR from the first light source device 20 or the second light source device 21 in accordance with the image information to thereby form the image light, and the projection optical device 6 projects the image light described above.

Due to this fact, according to the projector 1 related to the present embodiment, since there is provided the first light source device 20 for generating the fluorescence YL high in luminance, it is possible to form and then project the high-luminance image.

Second Embodiment

Then, another configuration of the projector as a second embodiment of the present disclosure will be described. It should be noted that in the present embodiment, constituents or members common to the first embodiment will be denoted by the same reference symbols, and the detailed description thereof will be omitted.

Figure 6:
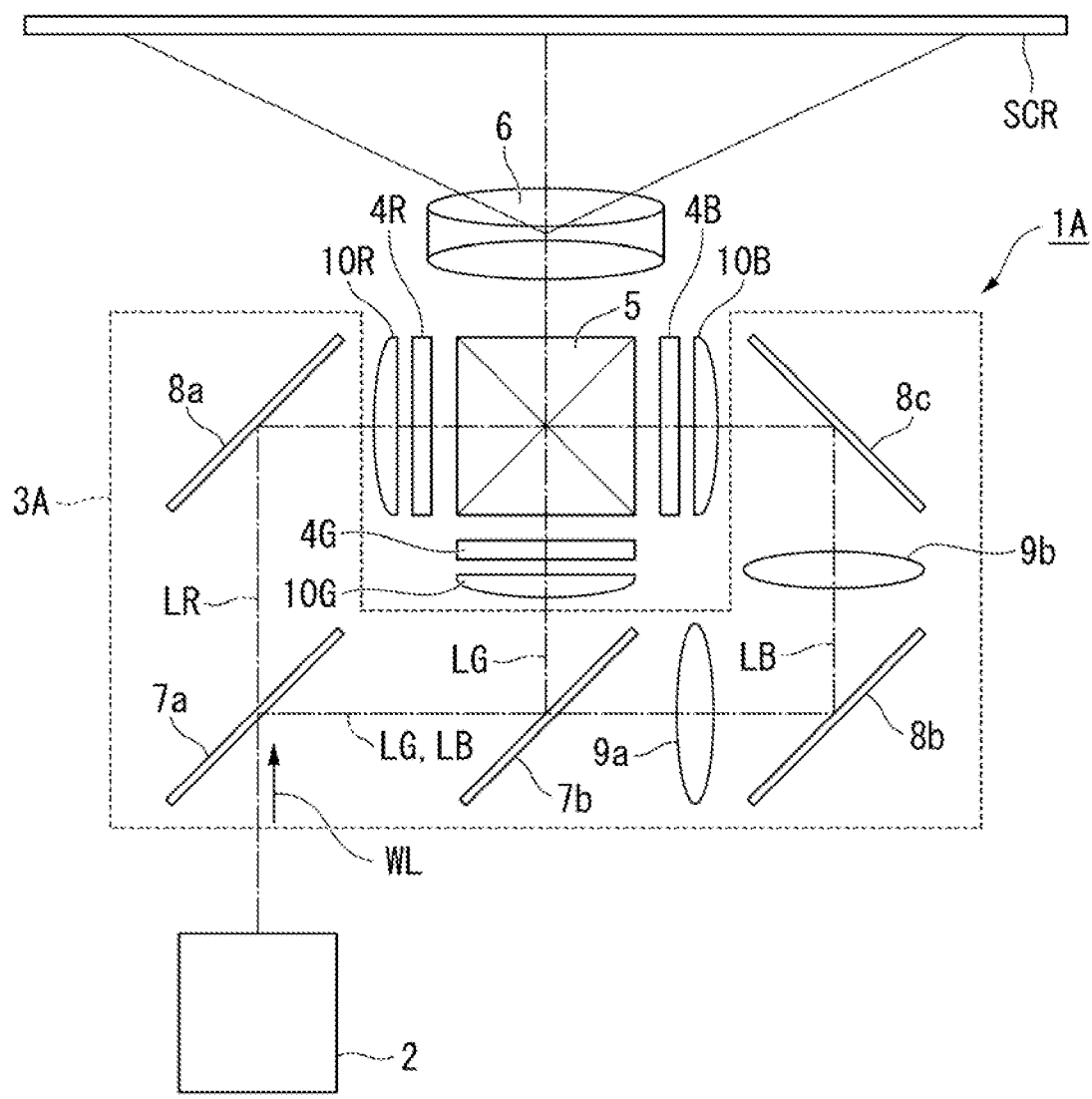
FIG. 6 is a diagram showing a schematic configuration of a projector according to a second embodiment.

FIG. 6 is a diagram showing a schematic configuration of the projector 1A according to the present embodiment.

As shown in FIG. 6, the projector 1A according to the present embodiment is a projection-type image display device for displaying a color image on the screen SCR. The projector 1A is provided with a color separation optical system 3A, the light modulation device 4R, the light modulation device 4G, the light modulation device 4B, the combining optical system 5, the projection optical device 6, and a light source device 2.

The color separation optical system. 3A separates the illumination light WL having a white color from the light source device 2 into the red light LR, the green light LG, and the blue light LB. The color separation optical system 3A is provided with a first dichroic mirror 7a and a second dichroic mirror 7b, a first reflecting mirror 8a, a second reflecting mirror 8b, and a third reflecting mirror 8c, and a first relay lens 9a and a second relay lens 9b.

The first dichroic mirror 7a separates the illumination light WL from the light source device 2 into the red light LR and the rest of the light, namely the green light LG and the blue light LB. The first dichroic mirror 7a transmits the red light LR thus separated from, and at the same time, reflects the rest of the light. The second dichroic mirror 7b reflects the green light LG, and at the same time, transmits the blue light LB.

The first reflecting mirror 8a reflects the red light LR toward the light modulation device 4R. The second reflecting mirror 8b and the third reflecting mirror 8c guide the blue light LB to the light modulation device 4B. The green light LG is reflected by the second dichroic mirror 7b toward the light modulation device 4G.

The first relay lens 9a is disposed in a posterior stage of the second dichroic mirror 7b in the light path of the blue light LB. The second relay lens 9b is disposed in a posterior stage of the second reflecting mirror 8b in the light path of the blue light LB.

The light modulation device 4R modulates the red light LR in accordance with image information to form image light corresponding to the red light LR. The light modulation device 4G modulates the green light LG in accordance with the image information to form image light corresponding to the green light LG. The light modulation device 4B modulates the blue light LB in accordance with the image information to form image light corresponding to the blue light LB.

As the light modulation device 4R, the light modulation device 4G, and the light modulation device 4B, there are used, for example, transmissive liquid crystal panels. Further, at the incident side and the exit side of the liquid crystal panel, there are respectively disposed polarization plates not shown, and thus, there is formed the configuration of transmitting only the linearly-polarized light having a specific direction.

At the incident side of the light modulation device 4R, the light modulation device 4G, and the light modulation device 4B, there are disposed the field lens 10R, the field lens 10G, and the field lens 10B, respectively. The field lens 10R, the field lens 10G, and the field lens 10B collimate the principal rays of the red light LR, the green light LG, and the blue light LB which enter the light modulation device 4R, the light modulation device 4G, and the light modulation device 4B, respectively.

The combining optical system 5 combines the image light corresponding to the red light LR, the image light corresponding to the green light LG, and the image light corresponding to the blue light LB with each other in response to incidence of the image light respectively emitted from the light modulation device 4R, the light modulation device 4G, and the light modulation device 4B, and then emits the image light thus synthesized toward the projection optical device 6. As the combining optical system 5, there is used, for example, a cross dichroic prism.

The projection optical device 6 is constituted by a plurality of lenses. The projection optical device 6 projects the image light having been synthesized by the combining optical system 5 toward the screen SCR in an enlarged manner. Thus, an image is displayed on the screen SCR.

Light Source Device

Figure 7:
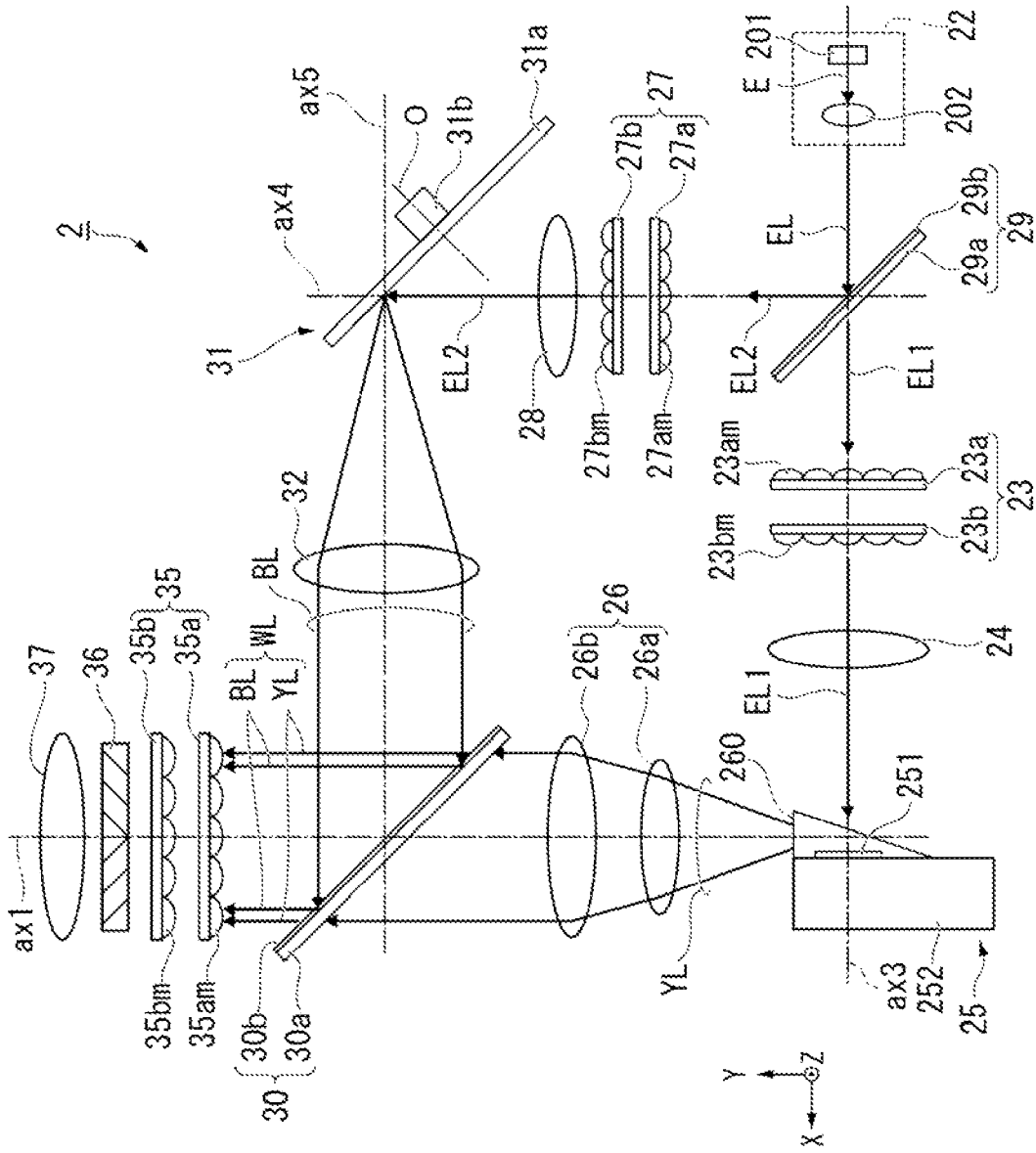
FIG. 7 is a schematic configuration diagram of a light source device according to the second embodiment.

FIG. 7 is a schematic configuration diagram of the light source device 2 according to the present embodiment.

In FIG. 7, the X axis is an axis parallel to an optical axis ax3 along a principal ray of the light emitted from the light source 22, and an optical axis ax5 along a principal ray of light emitted from a diffusion element 31. The Y axis is an axis which is perpendicular to the optical axis ax3, and is parallel to an optical axis ax4 along a principal ray of light reflected by a first optical element 29 and the illumination light axis ax1. The Z axis is an axis perpendicular to each of the X axis and the Y axis. In other words, the optical axis ax3, the optical axis ax4, the optical axis ax5, and the illumination light axis ax1 are located in the same plane, the optical axis ax3 and the optical axis ax5 is perpendicular to the illumination light axis ax1, and the optical axis ax4 is parallel to the illumination light axis ax1 and perpendicular to the optical axis ax3 and the optical axis ax5. In other words, the optical axis ax3, the optical axis ax4, the optical axis ax5, and the illumination light axis ax1 are located on a virtual plane along the X-Y plane.

As shown in FIG. 7, the light source device 2 is provided with the light source 22, a first homogenizer optical system 23, a first light collection optical system 24, the wavelength conversion element 25, a first pickup optical system 26, a second homogenizer optical system 27, a second light collection optical system 28, the first optical element 29, a second optical element 30, the diffusion element 31, a second pickup optical system 32, the integrator optical system 35, the polarization conversion element 36, and the superimposing lens 37, wherein these members are disposed on the virtual plane along the X-Y plane. The light source device 2 according to the present embodiment emits the illumination light WL having the white color.

The light source 22 includes the light emitting section 201 and the collimating lens 202. The light emitting section 201 is formed of a semiconductor laser. The light emitting section 201 emits the ray E consisting of the light beam having the peak wavelength of, for example, 445 nm. It should be noted that it is also possible to use a semiconductor laser for emitting the ray E having a wavelength other than 445 nm as the light emitting section 201. For example, it is possible for the light emitting section 201 to emit the ray E consisting of the light beam having the peak wavelength of 460 nm.

The collimating lens 202 is arranged so as to correspond to the light emitting section 201. The collimating lens 202 converts the ray E emitted from the light emitting section 201 into parallel light. It should be noted that the number of the light emitting sections 201 and the collimating lenses 202 is not particularly limited.

In such a manner, the light source 22 emits the excitation light (the light in the first wavelength band) EL as a parallel pencil having the blue wavelength band (the first wavelength band).

In the light source device 2 according to the present embodiment, on the optical axis ax3 of the light source 22, there are disposed the light source 22, the first optical element 29, the first homogenizer optical system 23, the first light collection optical system 24, and the wavelength conversion element 25.

In the light source device 2 according to the present embodiment, on the optical axis ax4, there are disposed the first optical element 29, the second homogenizer optical system 27, the second light collection optical system 28, and the diffusion element 31.

In the light source device 2 according to the present embodiment, on the optical axis ax5, there are disposed the diffusion element 31, the second pickup optical system 32, and the second optical element 30.

In the light source device 2 according to the present embodiment, on the illumination light axis ax1, there are disposed the wavelength conversion element 25, the first pickup optical system 26, the second optical element 30, the integrator optical system 35, the polarization conversion element 36, and the superimposing lens 37.

The excitation light EL emitted from the light source 22 enters the first optical element 29. The first optical element 29 is arranged so as to form an angle of 45° with each of the optical axis ax3 and the optical axis ax4.

The first optical element 29 is an element which transmits a part of the excitation light EL, and reflects another part of the excitation light EL. In the present embodiment, the first optical element 29 includes a light transmissive substrate 29a and a half mirror layer 29b. The light transmissive substrate 29a is a substrate having a light transmissive property with respect to the excitation light EL. The half mirror layer 29b is formed of, for example, a dielectric multilayer film deposited on the light transmissive substrate 29a. The half mirror layer 29b in the present embodiment is not limited to when an amount of transmitted light and an amount of reflected light are equal in proportion (50:50) in the excitation light EL, but can be a layer which does not completely reflect or transmit the excitation light EL, but transmits or reflects at least a part thereof, and reflects or transmits another part thereof.

The excitation light EL having been reflected by the first optical element 29 proceeds along the optical axis ax4, and then enters the second homogenizer optical system 27. The excitation light EL having been transmitted through the first optical element 29 proceeds along the optical axis ax3, and then enters the first homogenizer optical system 23. Hereinafter, the part of the excitation light EL having been transmitted through the first optical element 29 to be separated toward the X direction (a first direction) is referred to as excitation light EL1, and the another part of the excitation light EL having been reflected by the first optical element 29 to be separated toward the Y direction (a second direction) is referred to as blue light EL2.

The second homogenizer optical system 27 which the blue light (a part of the light in the first wavelength band) EL2 enters is constituted by, for example, a lens array 27a and a lens array 27b. The lens array 27a includes a plurality of small lenses 27am, and the lens array 27b includes a plurality of small lenses 27bm.

The lens array 27a separates the blue light EL2 into a plurality of small pencils. The small lenses 27am of the lens array 27a form images of the small pencils on the corresponding small lenses 27bm of the lens array 27b, respectively. The lens array 27b superimposes the images of the small lenses 27am of the lens array 27a on the diffusion element 31 together with the second light collection optical system 28 described later. The second light collection optical system 28 cooperates with the second homogenizer optical system 27 to homogenize the illuminance distribution of the blue light EL2 entering a surface of the diffusion element 31 to suppress the light density of the blue light EL2 on the diffusion element 31. It should be noted that the second light collection optical system 28 is constituted by a single lens or a plurality of lenses.

The diffusion element 31 diffuses the blue light EL2 and at the same time emits the result toward the second optical element 30. The diffusion element 31 includes a diffusely reflecting plate 31a and a motor 31b for rotating the diffusely reflecting plate 31a. The diffusely reflecting plate 31a reflects the blue light EL2 toward the second optical element 30 while diffusing the blue light EL2. It is desirable for the diffusely reflecting plate 31a to be formed so as to diffuse the blue light EL2 so as to have substantially the same diffusion angle as that of the fluorescence YL emitted from the wavelength conversion element 25. Thus, it is possible to reduce a color unevenness of the illumination light WL obtained by combining the blue light EL2 having been diffused and the fluorescence YL with each other.

A rotational axis O of the motor 31b is arranged so as to form an angle of 45° with the optical axes ax4, ax5. Thus, the diffusion element 31 makes it possible to rotate the plane of incidence of light of the diffusely reflecting plate 31a in a plane forming an angle of 45° with the optical axes ax4, ax5. The diffusely reflecting plate 31a is formed to have, for example, a circular shape when viewed from a direction of the rotational axis O, but the shape of the diffusely reflecting plate 31a is not limited to a circular disk. In the case of the present embodiment, by rotating the diffusely reflecting plate 31a, a rise in temperature of the diffusely reflecting plate 31a is suppressed, and it is possible to increase the reliability of the diffusion element 31.

It should be noted that although the diffusion element 31 in the present embodiment is a rotary diffusion element, it is possible to use a stationary diffusion element instead of this configuration. In this case, since the motor 31b becomes unnecessary, it is possible to reduce the cost of the diffusion element.

In the present embodiment, the blue light EL2 having entered the diffusion element 31 is reflected in a diffused state. The blue light EL2 diffusely reflected by the diffusion element 31 is hereinafter referred to as diffused blue light BL. In the present embodiment, a principal ray of the diffused blue light BL coincides with the optical axis ax5.

As described above, the diffusion element 31 reflects the blue light EL2, which is branched in the Y direction from the first optical element 29 and then enters the diffusion element 31, toward one side (the +X side) in the X direction as the diffused blue light BL. The diffused blue light BL emitted from the diffusion element 31 enters the second pickup optical system 32. The diffused blue light BL enters the second pickup optical system 32 in a state of spreading to have a pencil width in substantially the same level as that of the fluorescence YL emitted from the wavelength conversion element 25 described later. The second pickup optical system 32 has a function of picking up and then collimating the diffused blue light BL emitted from the diffusion element 31. The second pickup optical system 32 is constituted by a single lens or a plurality of lenses.

The diffused blue light BL collimated by the second pickup optical system 32 enters the second optical element 30. The second optical element 30 includes the light transmissive substrate 30a and the dichroic mirror 30b. The light transmissive substrate 30a in the present embodiment is a substrate having a light transmissive property with respect at least to the fluorescence YL as the light in the second wavelength band. The dichroic mirror 30b in the present embodiment has an optical characteristic of transmitting the fluorescence YL as the light in the second wavelength band emitted from the wavelength conversion element 25, and reflecting the diffused blue light BL as the light in the first wavelength band emitted from the diffusion element 31. Therefore, the second optical element 30 reflects the diffused blue light BL toward the one side (the +Y side) in the Y direction.

In contrast, the excitation light (the another part of the light in the first wavelength band) EL1 having been transmitted through the first optical element 29 enters the first homogenizer optical system 23. The first homogenizer optical system 23 is constituted by, for example, the lens array 23a and the lens array 23b. The lens array 23a includes a plurality of small lenses 23am, and the lens array 23b includes a plurality of small lenses 23bm.

The lens array 23a separates the excitation light EL1 into a plurality of small pencils. The small lenses 23am of the lens array 23a form images of the small pencils on the corresponding small lenses 23bm of the lens array 23b, respectively. The lens array 23b superimposes the images of the small lenses 23am of the lens array 23a on the phosphor layer 251 of the wavelength conversion element 25 together with the first light collection optical system 24 described later. The first light collection optical system 24 homogenizes the illuminance distribution of the excitation light EL1 which enters the surface of the phosphor layer 251 of the wavelength conversion element 25 in cooperation with the first homogenizer optical system 23. It should be noted that the first light collection optical system 24 is constituted by a single lens or a plurality of lenses.

The wavelength conversion element 25 has the phosphor layer 251 which is excited by the excitation light EL1 entering the phosphor layer 251 from the light source 22 toward the +X side to thereby generate the fluorescence YL, and a substrate 252 for supporting the phosphor layer 251. The wavelength conversion element 25 emits the fluorescence YL thus generated from an opening part 260 toward the one side (the +Y side) in the Y direction.

The fluorescence YL having been emitted from the wavelength conversion element 25 enters the first pickup optical system 26. The first pickup optical system 26 is constituted by, for example, the pickup lenses 26a, 26b. The pickup optical system 26 has a function of picking up and then collimating the fluorescence YL emitted from the phosphor layer 251. It should be noted that a focal distance of the first pickup optical system 26 for picking up to collimate the fluorescence YL emitted with the Lambertian emission is shorter than a focal distance of the second pickup optical system 32 for picking up to collimate the diffused blue light BL.

The fluorescence WL collimated by the first pickup optical system 26 enters the second optical element 30. The fluorescence YL is transmitted through the second optical element 30 and proceeds toward the integrator optical system 35.

In the light source device 2 according to the present embodiment, there is adopted a configuration in which the first optical element 29, the wavelength conversion element 25, the second optical element 30, and the diffusion element 31 are disposed at corners of a rectangle defined by the optical axes ax3, ax4, and ax5, and the illumination light axis ax1. Thus, in the light source device 2 according to the present embodiment, the excitation light EL emitted from the light source 22 is separated into the two components in the respective directions, namely the X direction and the Y direction, by the first optical element 29, the excitation light EL1 as one of the components enters the wavelength conversion element 25, and the blue light EL2 as the other of the components is made to enter the diffusion element 31. Further, in the light source device 2 according to the present embodiment, the diffused blue light BL emitted from the diffusion element 31 is reflected toward the Y direction by the second optical element 30 while the fluorescence YL emitted toward the Y direction from the wavelength conversion element 25 is transmitted toward the Y direction by the second optical element 30.

In such a manner, the second optical element 30 in the present embodiment reflects the diffused blue light BL, which is emitted from the diffusion element 31 toward the one side (the +X side) in the X direction, and then enters the second optical element 30, toward the one side (the +Y side) in the Y direction, and at the same time, transmits the fluorescence YL, which is emitted from the wavelength conversion element 25 toward the one side (the +Y side) in the Y direction, and then enters the second optical element 30, toward the one side (the +Y side) in the Y direction to thereby generate the illumination light WL having the white color obtained by combining the fluorescence YL and the diffused blue light BL with each other. In such a manner, it is possible for the light source device 2 to emit the illumination light WL having the white color toward the integrator optical system 35.

The illumination light WL having the white color enters the integrator optical system 35. The integrator optical system 35 is constituted by, for example, the first lens array 35a and the second lens array 35b. The first lens array 35a includes the plurality of first small lenses 35am, and the second lens array 35b includes the plurality of second small lenses 35bm.

The first lens array 35a separates the illumination light WL into a plurality of small pencils. The first small lenses 35am form images of the small pencils on the corresponding second small lenses 35bm, respectively. The integrator optical system 35 cooperates with the superimposing lens 37 described later to thereby homogenize the illuminance distribution of each of the image formation areas of the light modulation devices 4R, 4G and 4B shown in FIG. 7 as the illumination target areas.

The illumination light WL having passed through the integrator optical system 35 enters the polarization conversion element 36. The polarization conversion element 36 is constituted by, for example, the polarization separation film and the retardation plate (the ½ wave plate). The polarization conversion element 36 converts the polarization direction in the illumination light WL into one polarization component.

The illumination light WL having passed through the polarization conversion element 36 enters the superimposing lens 37. The illumination light WL having been emitted from the superimposing lens 37 enters the color separation optical system 3A. The superimposing lens 37 superimposes the plurality of small pencils described above forming the illumination light WL on each other in the illumination target areas, namely the image formation areas, of the light modulation devices 4R, 4G, and 4B to thereby homogenously illuminate the image formation areas.

Advantages of Second Embodiment

According to the light source device 2 related to the present embodiment described hereinabove, the following advantages are exerted.

The light source device 2 according to the present embodiment is provided with the light source 22 configured to emit the excitation light EL, the first optical element 29 which the excitation light EL enters, and which transmits the excitation light EL1 as a part of the excitation light EL, and reflects the blue light EL2 as another part of the excitation light EL, the wavelength conversion element 25 which the excitation light EL1 enters, and which performs the wavelength conversion on the excitation light EL1 to emit the fluorescence YL different in wavelength band from the excitation light EL1, the diffusion element 31 which the blue light EL2 enters, the which diffuses the blue light EL2, and the second optical element 30 configured to combine the fluorescence YL emitted from the wavelength conversion element 25 and the diffused blue light BL emitted from the diffusion element 31 with each other. The wavelength conversion element 25 includes the phosphor layer 251 which performs the wavelength conversion on the excitation light EL1 having entered the obverse surface 2511 to generate the fluorescence YL, the substrate 252 having the support surface 2521 configured to support the phosphor layer 251, the first optical member 254 which has the first optical layer 2542 configured to transmit the excitation light EL and reflect the fluorescence YL, and in which the first optical layer 2542 is disposed so as to be opposed to the support surface 2521, the second optical member 255 which has the second optical layer 2552 configured to reflect at least the fluorescence YL, and in which the second optical layer 2552 is disposed so as to cross the support surface 2521 and the first optical layer 2542, the third optical member 256 which has the third optical layer 2562 configured to reflect at least the fluorescence YL, and in which the third optical layer 2562 is disposed so as to cross the support surface 2521 and the first optical layer 2542, and so as to be opposed to the second optical layer 2552, and the opening part 260 constituted by the substrate 252, the first optical member 254, the second optical member 255, and the third optical member 256. The area A1 of the obverse surface 2511 of the phosphor layer 251 is larger than the area A2 of the excitation light incident region LS which the excitation light EL enters in the obverse surface 2511, the area A2 of the excitation light incident region LS is larger than the area A3 of the opening part 260, and the fluorescence YL is emitted from the opening part 260.

In the light source device 2 according to the present embodiment, the excitation light EL emitted from the light source 22 is separated by the first optical element 29 using the half mirror layer 29b, the excitation light EL1 as one of the components obtained by the separation enters the wavelength conversion element 25, and the blue light EL2 as the other of the components obtained by the separation is made to enter the diffusion element 31. Further, in the second optical element 30 using the dichroic mirror 30b, the fluorescence YL emitted from the wavelength conversion element 25 and the diffused blue light BL emitted from the diffusion element 31 are combined with each other to generate the illumination light WL having the white color. As described above, in the light source device 2 according to the present embodiment, since the illumination light WL can be synthesized without using the polarized light, there is no need to use an expensive retardation plate or an expensive lens member for suppressing polarization disturbance. Therefore, it is possible to achieve the reduction in cost of the light source device 2.

Further, according to the light source device 2 related to the present embodiment, since the fluorescence YL is emitted from the opening part 260 smaller in area than the excitation light incident region LS which the excitation light EL is made to enter, the apparent light emission area of the fluorescence YL becomes smaller compared to the configuration in which the fluorescence YL is directly taken out from the excitation light incident region LS. Thus, it is possible to reduce the etendue in the fluorescence YL. Further, in the wavelength conversion element 25 according to the present embodiment, since it is possible to reduce the etendue without reducing the incident area of the excitation light EL on the phosphor layer 251, the light density of the excitation light EL does not become high in the obverse surface 2511 of the phosphor layer 251. Therefore, it is possible to prevent the decrease in fluorescence conversion efficiency due to the increase in light density.

Therefore, according to the light source device 2 related to the present embodiment, since there is provided the wavelength conversion element 25 in which the etendue is made small while preventing the decrease in the fluorescence conversion efficiency due to the increase in light density of the excitation light EL, it is possible to generate the fluorescence YL high in luminance.

In the light source device 2 according to the present embodiment, the first optical element 29 includes the light transmissive substrate 29a and the half mirror layer 29b provided to the light transmissive substrate 29a.

According to this configuration, since there is used the first optical element 29 constituted by the light transmissive substrate 29a and the half mirror layer 29b, it is possible to suppress light absorption by the first optical element 29.

Therefore, it is possible to suppress the light loss of the excitation light EL caused by passing through the first optical element 29.

In the light source device 2 according to the present embodiment, the second optical element 30 includes the dichroic mirror 30b which transmits the fluorescence YL and reflects the diffused blue light BL.

According to this configuration, it is possible to generate the illumination light WL obtained by combining the fluorescence YL and the diffused blue light BL with each other without using the polarized light.

In the light source device 2 according to the present embodiment, the first optical element 29 branches the excitation light EL which enters the first optical element 29 from the light source 22 into one in the X direction along the X-Y plane in which the light source 22, the first optical element 29, and the second optical element 30 are disposed, and one in the Y direction which is perpendicular to the X direction and is along the X-Y plane, the diffusion element 31 reflects the blue light EL2, which is branched by the first optical element 29 toward the Y direction and then enters the diffusion element 31, toward the X direction, and the wavelength conversion element 25 performs the wavelength conversion on the excitation light EL1, which is branched by the first optical element 29 toward the X direction and then enters the wavelength conversion element 25, and then emits the fluorescence YL toward the Y direction. In the case of the present embodiment, the second optical element 30 synthesizes the illumination light WL by reflecting the diffused blue light BL, which is emitted toward the X direction from the diffusion element 31 and then enters the second optical element 30, toward the Y direction, and at the same time transmitting the fluorescence YL, which is emitted toward the Y direction from the wavelength conversion element 25 and then enters the second optical element 30, toward the Y direction.

According to this configuration, it is possible to realize the light source device which separates the excitation light EL emitted from the light source 22 into components respectively proceeding in the X direction and the Y direction with the first optical element 29, and then combines the fluorescence YL generated from the excitation light EL1 as the component separated toward the X direction and the diffused blue light BL generated from the blue light EL2 as the component separated toward the Y direction with each other in the second optical element 30 to generate the illumination light WL.

In the light source device 2 according to the present embodiment, the phosphor layer 251 includes the air holes K configured to scatter light.

According to this configuration, since the fluorescence YL having reentered the phosphor layer 251 is diffused inside, it is possible to emit the fluorescence YL having reentered the phosphor layer 251 with the Lambertian emission.

In the light source device 2 according to the present embodiment, the angle of the first optical member 254 formed with respect to the obverse surface 2511 of the phosphor layer 251 is no smaller than 10° and no larger than 40°.

According to this configuration, by making the first optical member 254 closer to the obverse surface 2511 of the phosphor layer 251, it is possible to realize the configuration in which the area A3 of the opening part 260 is made smaller than the area A2 of the excitation light incident region LS.

In the light source device 2 according to the present embodiment, the second optical member 255 includes the second optical layer 2552 configured to reflect the excitation light EL and the fluorescence YL, and the third optical member 256 includes the third optical layer 2562 configured to reflect the excitation light EL and the fluorescence YL.

According to this configuration, it is possible to reflect the fluorescence YL having been emitted from the side surfaces 2512 of the phosphor layer 251 to return the fluorescence YL to the phosphor layer 251. Further, it is possible to reflect the excitation light EL to make the excitation light EL enter the phosphor layer 251. Thus, it is possible to improve the use efficiency of the excitation light EL and the fluorescence YL.

In the light source device 2 according to the present embodiment, there is further provided the fourth optical layer 253 disposed between the substrate 252 and the phosphor layer 251.

According to this configuration, by reflecting the fluorescence YL proceeding in the phosphor layer 251 toward the substrate 252, it is possible to emit the fluorescence YL proceeding in the phosphor layer 251 toward the substrate 252 from the obverse surface 2511. Thus, it is possible to increase the light use efficiency of the fluorescence YL.

In the light source device 2 according to the present embodiment, the fourth optical layer 253 is disposed in at least a part of the periphery of the phosphor layer 251 in the support surface 2521 of the substrate 252.

According to this configuration, it is possible to reflect the fluorescence YL having been emitted from the side surfaces 2512 of the phosphor layer 251 to return the fluorescence YL to the phosphor layer 251. Further, the fluorescence YL having been emitted from the side surfaces 2512 of the phosphor layer 251 is reflected to be emitted from the phosphor layer 260. Therefore, it is possible to increase the light use efficiency of the fluorescence YL.

In the light source device 2 according to the present embodiment, the first optical member 254 is disposed so as not to have contact with the phosphor layer 251.

According to this configuration, since the first optical member 254 does not make contact with the phosphor layer 251, it is possible to prevent the deformation and the breakage of the first optical member 254 due to the heat of the phosphor layer 251.

In the light source device 2 according to the present embodiment, the first optical member 254 includes the first optical layer 2542 configured to transmit the excitation light EL and at the same time reflect the fluorescence YL.

According to this configuration, it is possible to realize the configuration in which the phosphor layer 251 housed in the housing space S is efficiently excited, and the fluorescence YL thus generated is reflected and is then taken out from the opening part 260.

In the light source device 2 according to the present embodiment, the phosphor layer 251 is housed in the housing space S disposed inside the opening part 260, and the air layer AR is disposed in the housing space S.

Here, when the housing space S is filled with a prism material such as glass, light is totally reflected by a prism exit surface not to thereby be efficiently emitted outside the opening part 260 from the inside of the housing space S. In contrast, according to the configuration of the present embodiment, since the housing space S is filled with the air layer AR, it is possible to emit the fluorescence YL from the opening part 260 in good condition.

According to the projector 1A related to the present embodiment described hereinabove, the following advantages are exerted.

The projector 1A according to the present embodiment is provided with the light source device 2, the light modulation devices 4B, 4G, and 4R, and the projection optical device 6, wherein the light modulation devices 4B, 4G, and 4R modulate the blue light LB, the green light LG, and the red light LR from the light source device 2 in accordance with the image information to thereby form the image light, and the projection optical device 6 projects the image light described above.

Due to this fact, according to the projector 1A related to the present embodiment, since there is provided the light source device 2 for generating the fluorescence YL high in luminance, it is possible to form and then project the high-luminance image.

Third Embodiment

Then, a light source device according to a third embodiment will be described. The light source device according to the present embodiment is different in positions of the wavelength conversion element 25 and the diffusion element 31 from the light source device according to the second embodiment.

Figure 8:
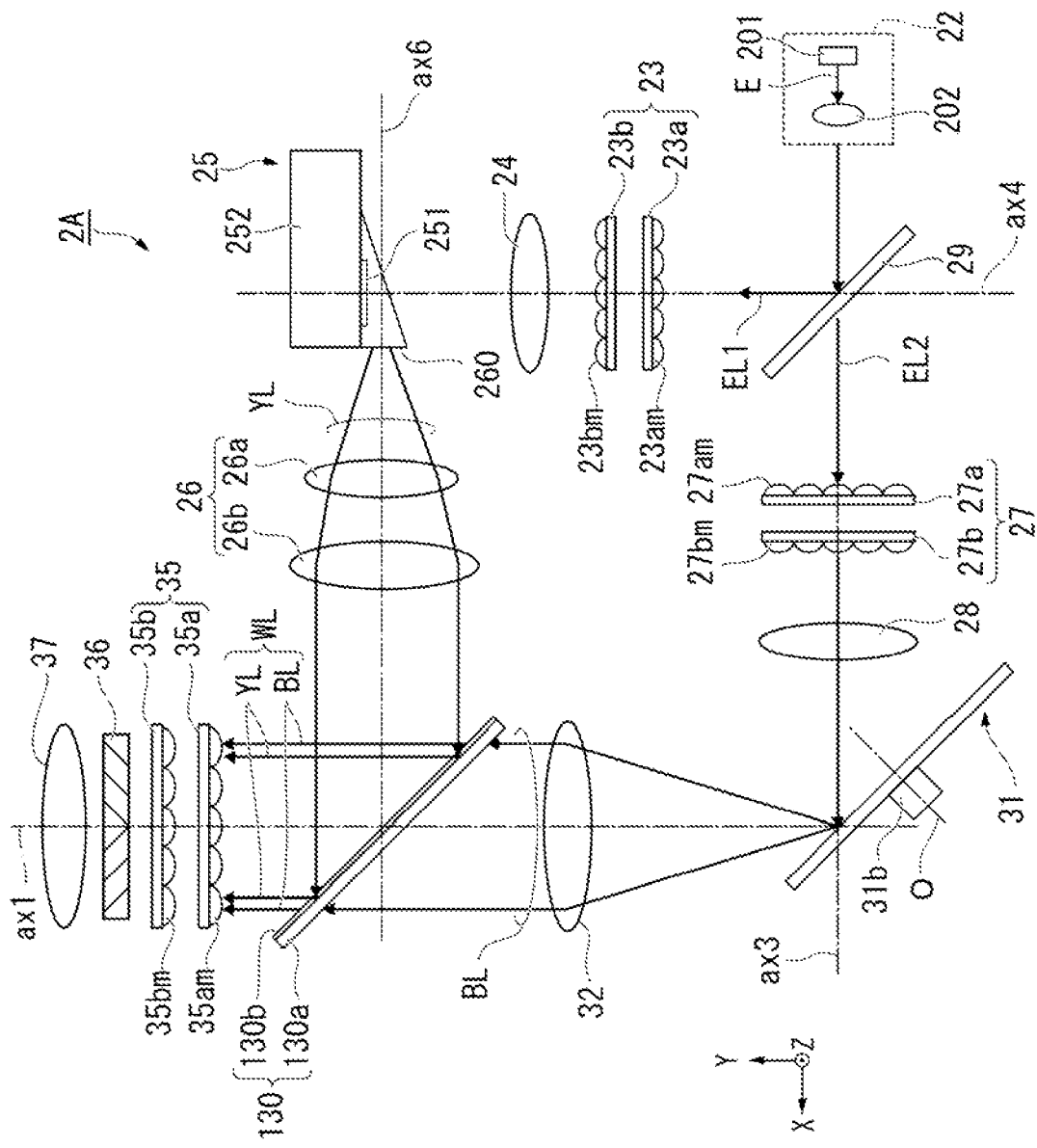
FIG. 8 is a schematic configuration diagram of a light source device according to a third embodiment.

FIG. 8 is a schematic configuration diagram of the light source device 2A according to the present embodiment. It should be noted that constituents and members common to the light source device according to the second embodiment will be denoted by the same reference symbols, and the detailed description thereof will be omitted.

As shown in FIG. 8, in the light source device 2A according to the present embodiment, on the optical axis ax3 of the light source 22, there are disposed the light source 22, the first optical element 29, the second homogenizer optical system 27, the second light collection optical system 28, and the diffusion element 31. In the light source device 2A according to the present embodiment, on the optical axis ax4, there are disposed the first optical element 29, the first homogenizer optical system 23, the first light collection optical system 24, and the wavelength conversion element 25. In the light source device 2A according to the present embodiment, on an optical axis ax6 along a principal ray of the fluorescence YL emitted from the wavelength conversion element 25, there are disposed the wavelength conversion element 25, the first pickup optical system 26, and a second optical element 130. In the light source device 2A according to the present embodiment, on the illumination light axis ax1, there are disposed the diffusion element 31, the second pickup optical system 32, the second optical element 130, the integrator optical system 35, the polarization conversion element 36, and the superimposing lens 37.

In the present embodiment, the part of the excitation light EL having been transmitted through the first optical element 29 to be separated toward the X direction (the first direction) is referred to as the blue light (a part of the light in the first wavelength band) EL2, and the another part of the excitation light EL having been reflected by the first optical element 29 to be separated toward the Y direction (the second direction) is referred to as the excitation light (another part of the light in the first wavelength band) EL1.

The blue light EL2 having been transmitted through the first optical element 29 proceeds toward the X direction along the optical axis ax3, and then enters the surface of the diffusion element 31 via the second homogenizer optical system 27 and the second light collection optical system 28.

The diffusion element 31 in the present embodiment makes it possible to rotate the plane of incidence of light of the diffusely reflecting plate 31a in a plane forming an angle of 45° with the optical axis ax3 and the illumination light axis ax1. The diffusion element 31 reflects the blue light EL2, which is branched toward the X direction from the first optical element 29 and then enters the diffusion element 31, toward one side (the +Y side) in the Y direction (the second direction) as the diffused blue light BL. In the present embodiment, a principal ray of the diffused blue light BL coincides with the illumination light axis ax1.

The diffused blue light BL emitted from the diffusion element 31 is collimated by the second pickup optical system 32, and then enters the second optical element 130. The second optical element 130 in the present embodiment includes the light transmissive substrate 130a and the dichroic mirror 130b. The light transmissive substrate 130a in the present embodiment is a substrate having a light transmissive property with respect at least to the diffused blue light BL as the light in the first wavelength band. The dichroic mirror 130b in the present embodiment has an optical characteristic of reflecting the fluorescence YL as the light in the second wavelength band emitted from the wavelength conversion element 25, and transmitting the diffused blue light BL as the light in the first wavelength band emitted from the diffusion element 31. Therefore, the second optical element 130 transmits the diffused blue light BL toward the one side (the +Y side) in the Y direction.

In contrast, the excitation light (another part of the light in the first wavelength band) EL1 reflected by the first optical element 29 proceeds in the Y direction along the optical axis ax4, and then enters the wavelength conversion element 25 via the first homogenizer optical system 23 and the first light collection optical system 24. The wavelength conversion element 25 according to the present embodiment emits the fluorescence YL, which is generated by the wavelength conversion element 25 being excited by the excitation light EL1 entering the wavelength conversion element 25, from the opening part 260 toward the one side (the +X side) in the X direction.

The fluorescence YL having been emitted from the wavelength conversion element 25 is collimated by the first pickup optical system 26 and then enters the second optical element 130. The second optical element 130 in the present embodiment transmits the diffused blue light BL, which is emitted from the diffusion element 31 toward the one side (the +Y side) in the Y direction, and then enters the second optical element 130, toward the one side (the +Y side) in the Y direction, and at the same time, reflects the fluorescence YL, which is emitted from the wavelength conversion element 25 toward the one side (the +X side) in the X direction, and then enters the second optical element 130, toward the one side (the +Y side) in the Y direction to thereby generate the illumination light WL having the white color obtained by combining the fluorescence YL and the diffused blue light BL with each other. In such a manner, it is possible for the light source device 2A according to the present embodiment to emit the illumination light WL having the white color toward the integrator optical system 35.

Advantages of Third Embodiment

In the light source device 2A according to the present embodiment, the first optical element 29 branches the excitation light EL entering the first optical element 29 from the light source 22 into components respectively proceeding in the X direction and the Y direction, the diffusion element 31 diffusely reflects the blue light EL2, which is the component branched by the first optical element 29 toward the X direction and then enters the diffusion element 31, toward the Y direction, and the wavelength conversion element 25 performs the wavelength conversion on the excitation light EL1, which is the component branched by the first optical element 29 toward the Y direction and then enters the wavelength conversion element 25, and then emits the fluorescence YL toward the X direction. In the case of the present embodiment, the second optical element 130 synthesizes the illumination light WL by transmitting the diffused blue light BL, which is emitted toward the Y direction from the diffusion element 31 and then enters the second optical element 130, toward the Y direction, and at the same time reflecting the fluorescence YL, which is emitted toward the X direction from the wavelength conversion element 25 and then enters the second optical element 130, toward the Y direction.

According to the light source device 2A related to the present embodiment, it is possible to separate the excitation light EL emitted from the light source 22 into the components respectively proceeding in the X direction and the Y direction with the first optical element 29, and then combine the diffused blue light BL generated from the blue light EL2 as the component separated toward the X direction and the fluorescence YL generated from the excitation light EL1 as the component separated toward the Y direction with each other with the second optical element 130 to generate the illumination light WL. Therefore, also in the light source device 2A according to the present embodiment, since the illumination light WL is synthesized without using the polarized light similarly to the light source device 2 according to the second embodiment, there is no need to use the expensive retardation plate or the expensive lens member for suppressing the polarization disturbance, and it is possible to realize the reduction in cost. Further, since there is provided the wavelength conversion element 25 in which the etendue is made small while preventing the decrease in the fluorescence conversion efficiency due to the increase in light density of the excitation light EL, it is possible to generate the fluorescence YL high in luminance.

Fourth Embodiment

Then, a light source device according to a fourth embodiment will be described. The light source device according to the present embodiment is different in configuration of the diffusion element 31 from the light source device according to the second embodiment.

Figure 9:
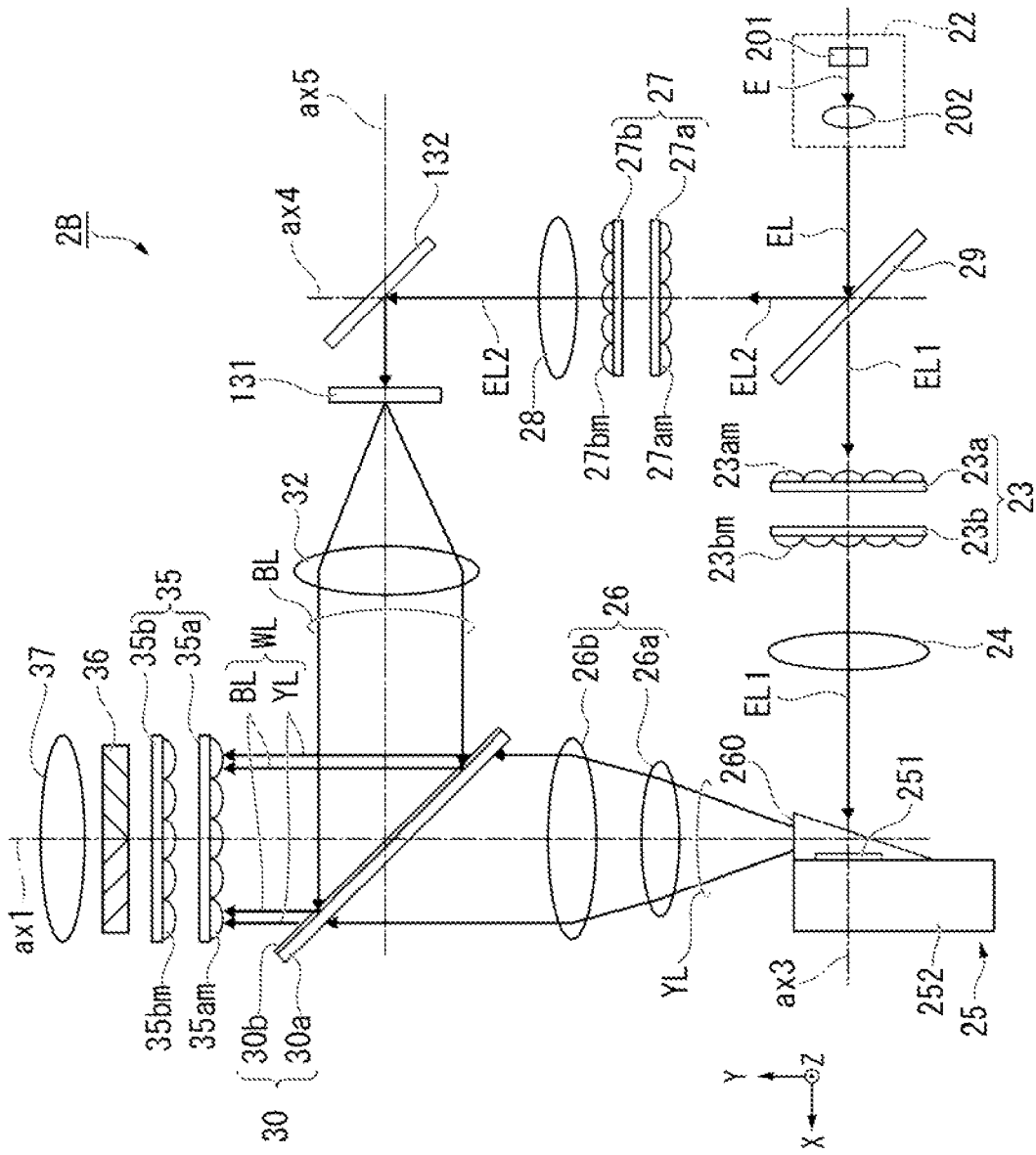
FIG. 9 is a schematic configuration diagram of a light source device according to a fourth embodiment.

FIG. 9 is a schematic configuration diagram of the light source device 2B according to the present embodiment. It should be noted that constituents and members common to the light source device according to the second embodiment will be denoted by the same reference symbols, and the detailed description thereof will be omitted.

As shown in FIG. 9, in the light source device 2B according to the present embodiment, on the optical axis ax4, there are disposed the first optical element 29, the second homogenizer optical system 27, the second light collection optical system 28, and a mirror 132. Further, on the optical axis ax5, there are disposed the mirror 132, the diffusion element 131, the second pickup optical system 32, and the second optical element 30.

The mirror 132 reflects the blue light EL2, which is branched in the Y direction from the first optical element 29 and then enters the mirror 132, toward the X direction. The mirror 132 is formed of, for example, a metal layer or a dielectric film. The mirror 132 is disposed so as to form an angle of 45° with the optical axes ax4, ax5. In the present embodiment, a principal ray of the blue light BL2 reflected by the mirror 132 coincides with the optical axis ax5.

The blue light EL2 reflected by the mirror 132 enters the diffusion element 131. The diffusion element 131 diffuses the blue light EL2 toward the second optical element 30, and emits the result toward the one side (the +X side) in the X direction. It is desirable for the diffusion element 131 to be formed so as to diffuse the blue light EL2 so as to have substantially the same diffusion angle as that of the fluorescence YL emitted from the wavelength conversion element 25. Thus, it is possible to reduce a color unevenness of the illumination light WL obtained by combining the blue light EL2 having been diffused and the fluorescence YL with each other. The diffusion element 131 in the present embodiment is formed of, for example, frosted glass.

It should be noted that although the diffusion element 131 and the mirror 132 in the present embodiment are both stationary elements, it is possible to use rotary elements instead of this configuration. In this case, by rotating the diffusion element 131 and the mirror 132, the rise in temperature of the diffusion element 131 and the mirror 132 can be suppressed, and thus, it is possible to enhance the reliability.

The blue light EL2 diffusely reflected by the diffusion element 131 is hereinafter referred to as diffused blue light BL. In the present embodiment, the principal ray of the diffused blue light BL coincides with the optical axis ax5.

As described above, the diffusion element 131 in the present embodiment diffusely emits the blue light EL2, which is branched in the Y direction from the first optical element 29 and is then reflected by the mirror 132 toward the X direction to enter the diffusion element 131, toward the one side (the +X side) in the X direction as the diffused blue light BL. The diffused blue light BL emitted from the diffusion element 131 is collimated by the second pickup optical system 32, and then enters the second optical element 30, and is then combined with the fluorescence YL emitted from the wavelength conversion element 25 to form the illumination light WL.

Advantages of Fourth Embodiment

In the light source device 2B according to the present embodiment, the first optical element 29 branches the excitation light EL entering the first optical element 29 from the light source 22 into the components respectively proceeding in the X direction and the Y direction, the mirror 132 reflects the blue light EL2, which is the component branched by the first optical element 29 toward the Y direction and then enters the mirror 132, toward the X direction, and the diffusion element 131 emits the diffused blue light BL, which is obtained by diffusing the blue light EL2 entering the diffusion element 131 in the X direction from the mirror 132, toward the X direction. The wavelength conversion element 25 performs the wavelength conversion on the excitation light EL1, which is the component branched by the first optical element 29 toward the X direction and then enters the wavelength conversion element 25, and then emits the fluorescence YL toward the Y direction. In the case of the present embodiment, the second optical element 30 synthesizes the illumination light WL by reflecting the diffused blue light BL, which is emitted toward the X direction from the diffusion element 31 and then enters the second optical element 30, toward the Y direction, and at the same time transmitting the fluorescence YL, which is emitted toward the Y direction from the wavelength conversion element 25 and then enters the second optical element 30, toward the Y direction.

According to the light source device 2B related to the present embodiment, it is possible to separate the excitation light EL emitted from the light source 22 into the components respectively proceeding in the X direction and the Y direction with the first optical element 29, and then combine the diffused blue light BL generated from the blue light EL2 as the component separated toward the Y direction and the fluorescence YL generated by performing the wavelength conversion on the excitation light EL1 as the component separated toward the X direction with the wavelength conversion element 25 with each other in the second optical element 30 to generate the illumination light WL. Therefore, also in the light source device 2B according to the present embodiment, since the illumination light WL is synthesized without using the polarized light similarly to the light source device 2 according to the second embodiment, there is no need to use the expensive retardation plate or the expensive lens member for suppressing the polarization disturbance, and it is possible to realize the reduction in cost. Further, since there is provided the wavelength conversion element 25 in which the etendue is made small while preventing the decrease in the fluorescence conversion efficiency due to the increase in light density of the excitation light EL, it is possible to generate the fluorescence YL high in luminance.

Further, in the case of the present embodiment, since the mirror 132 is provided separately from the diffusion element 131, it is sufficient to design the diffusion element 131 taking only the diffusion performance into consideration, and thus, the design of the diffusion element 131 becomes easy.

Fifth Embodiment

Then, a light source device according to a fifth embodiment will be described. The light source device according to the present embodiment is different in positions of the wavelength conversion element 25, the diffusion element 131, and the mirror 132 from the light source device according to the fourth embodiment. In other words, the light source device according to the present embodiment has a configuration obtained by combining the third embodiment and the fourth embodiment with each other.

Figure 10:
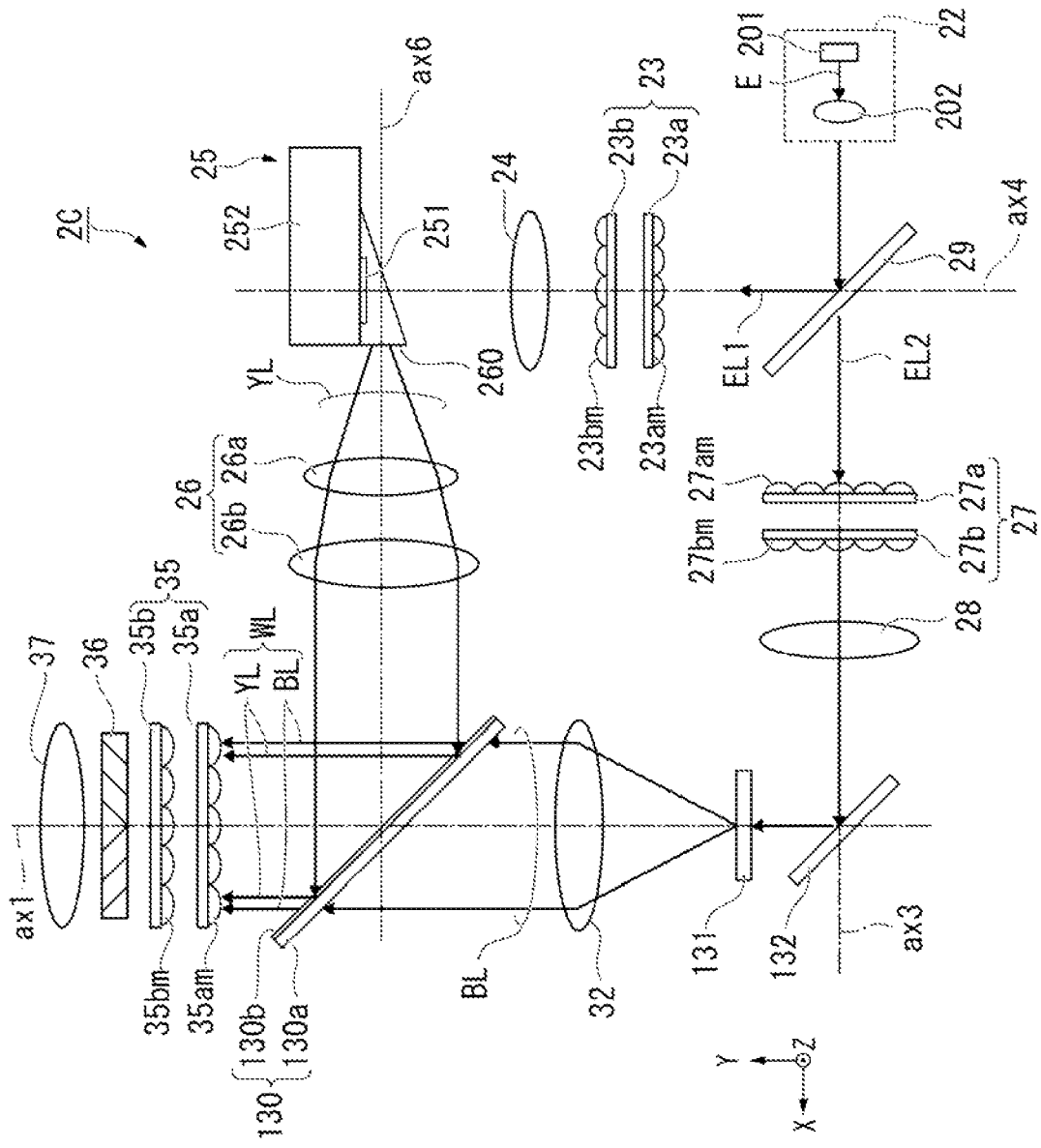
FIG. 10 is a schematic configuration diagram of a light source device according to a fifth embodiment.

FIG. 10 is a schematic configuration diagram of the light source device 2C according to the present embodiment. It should be noted that constituents and members common to the light source device according to the second embodiment will be denoted by the same reference symbols, and the detailed description thereof will be omitted.

As shown in FIG. 10, in the light source device 2C according to the present embodiment, on the optical axis ax3 of the light source 22, there are disposed the light source 22, the first optical element 29, the second homogenizer optical system 27, the second light collection optical system 28, and the mirror 132. Further, on the optical axis ax4, there are disposed the first optical element 29, the first homogenizer optical system 23, the first light collection optical system 24, and the wavelength conversion element 25. In the light source device 2C according to the present embodiment, on the optical axis ax6 along the principal ray of the fluorescence YL emitted from the wavelength conversion element 25, there are disposed the wavelength conversion element 25, the first pickup optical system 26, and the second optical element 130. In the light source device 2C according to the present embodiment, on the illumination light axis ax1, there are disposed the mirror 132, the diffusion element 131, the second pickup optical system 32, the second optical element 130, the integrator optical system 35, the polarization conversion element 36, and the superimposing lens 37.

In the present embodiment, the part of the excitation light EL having been transmitted through the first optical element 29 to be separated toward the X direction (the first direction) is referred to as the blue light (a part of the light in the first wavelength band) EL2, and the another part of the excitation light EL having been reflected by the first optical element 29 to be separated toward the Y direction (the second direction) is referred to as the excitation light (another part of the light in the first wavelength band) EL1.

The excitation light EL1 having been reflected by the first optical element 29 proceeds toward the Y direction along the optical axis ax4, and then enters the wavelength conversion element 25 surface of the diffusion element 25 via the first homogenizer optical system 23 and the first light collection optical system 24. The fluorescence YL having been emitted toward the Y direction from the wavelength conversion element 25 is collimated by the first pickup optical system 26 and then enters the second optical element 130.

The mirror 132 reflects the blue light EL2, which is branched in the X direction from the first optical element 29 and then enters the mirror 132, toward the Y direction. The mirror 132 in the present embodiment is disposed so as to form an angle of 45° with the optical axis ax3 and the illumination light axis ax1. In the present embodiment, the principal ray of the blue light EL2 reflected by the mirror 132 coincides with the illumination light axis ax1.

The blue light EL2 reflected by the mirror 132 enters the diffusion element 131. The diffusion element 131 diffuses the blue light EL2 toward the second optical element 130, and emits the diffused blue light BL toward the one side (the +Y side) in the Y direction. In the present embodiment, the principal ray of the diffused blue light BL coincides with the illumination light axis ax1.

As described above, the diffusion element 131 in the present embodiment diffusely emits the blue light EL2, which is branched in the X direction from the first optical element 29 and is then reflected by the mirror 132 toward the Y direction to enter the diffusion element 131, toward the one side (the +Y side) in the Y direction as the diffused blue light BL. The diffused blue light BL emitted from the diffusion element 131 is collimated by the second pickup optical system 32, and then enters the second optical element 130.

The second optical element 130 in the present embodiment transmits the diffused blue light BL, which is emitted from the diffusion element 131 toward the one side (the +Y side) in the Y direction, and then enters the second optical element 130, toward the one side (the +Y side) in the Y direction, and at the same time, reflects the fluorescence YL, which is emitted from the wavelength conversion element 25 toward the one side (the +X side) in the X direction, and then enters the second optical element 130, toward the one side (the +Y side) in the Y direction to thereby generate the illumination light WL having the white color obtained by combining the fluorescence YL and the diffused blue light BL with each other.

Advantages of Fifth Embodiment

In the light source device 2C according to the present embodiment, the first optical element 29 branches the excitation light EL entering the first optical element 29 from the light source 22 into the components respectively proceeding in the X direction and the Y direction, the mirror 132 reflects the blue light EL2, which is the component branched by the first optical element 29 toward the X direction and then enters the mirror 132, toward the X direction, and the diffusion element 131 emits the diffused blue light BL, which is obtained by diffusing the blue light EL2 entering the diffusion element 131 in the Y direction from the mirror 132, toward the Y direction. The wavelength conversion element 25 performs the wavelength conversion on the excitation light EL1, which is the component branched by the first optical element 29 toward the Y direction and then enters the wavelength conversion element 25, and then emits the fluorescence YL toward the X direction. In the case of the present embodiment, the second optical element 130 synthesizes the illumination light WL by transmitting the diffused blue light BL, which is emitted toward the Y direction from the diffusion element 31 and then enters the second optical element 130, toward the Y direction, and at the same time reflecting the fluorescence YL, which is emitted toward the X direction from the wavelength conversion element 25 and then enters the second optical element 130, toward the Y direction.

According to the light source device 2C related to the present embodiment, it is possible to separate the excitation light EL emitted from the light source 22 into the components respectively proceeding in the X direction and the Y direction with the first optical element 29, and then combine the diffused blue light BL generated from the blue light EL2 as the component separated toward the X direction and the fluorescence YL generated by performing the wavelength conversion on the excitation light EL1 as the component separated toward the Y direction with the wavelength conversion element 25 with each other in the second optical element 130 to generate the illumination light WL. Therefore, also in the light source device 2C according to the present embodiment, since the illumination light WL is synthesized without using the polarized light similarly to the light source device 2 according to the second embodiment, there is no need to use the expensive retardation plate or the expensive lens member for suppressing the polarization disturbance, and it is possible to realize the reduction in cost. Further, since there is provided the wavelength conversion element 25 in which the etendue is made small while preventing the decrease in the fluorescence conversion efficiency due to the increase in light density of the excitation light EL, it is possible to generate the fluorescence YL high in luminance. Further, in the case of the present embodiment, since the mirror 132 is provided separately from the diffusion element 131, it is sufficient to design the diffusion element 131 taking only the diffusion performance into consideration, and thus, the design of the diffusion element 131 becomes easy.

Sixth Embodiment

Then, a light source device according to a sixth embodiment will be described. The light source device according to the present embodiment is different in configuration provided with a reflecting element from the light source device according to the second embodiment.

In the embodiment described above, there is described when the whole of the excitation light EL having entered the wavelength conversion element 25 is converted into the fluorescence YL, and only the fluorescence YL is emitted from the wavelength conversion element 25. However, a part of the excitation light EL back-scattered by the phosphor layer 251 is emitted outside from the opening part 260 in some cases. The part of the excitation light EL back-scattered and then emitted from the opening part 260 is hereinafter referred to as back-scattered light.

Figure 11:
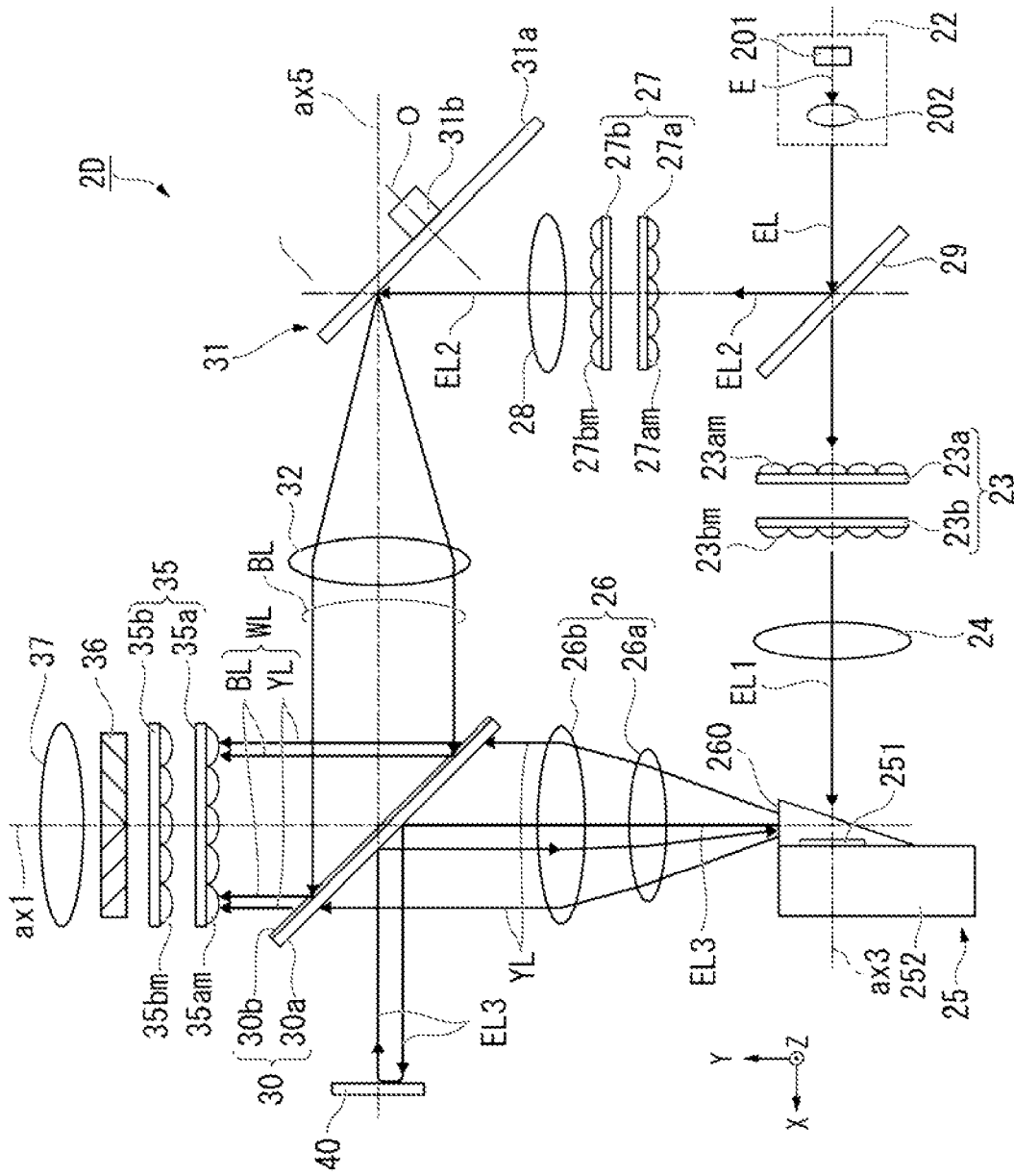
FIG. 11 is a schematic configuration diagram of a light source device according to a sixth embodiment.

FIG. 11 is a schematic configuration diagram of the light source device 2D according to the present embodiment. It should be noted that constituents and members common to the light source device according to the second embodiment will be denoted by the same reference symbols, and the detailed description thereof will be omitted.

As shown in FIG. 11, in the light source device 2D according to the present embodiment, on the optical axis ax5, there are disposed the diffusion element 31, the second pickup optical system 32, the second optical element 30, and a reflecting element 40.

In the present embodiment, it is assumed that back-scattered light EL3 as the light in the first wavelength band is emitted together with the fluorescence YL from the opening part 260 of the wavelength conversion element 25. The back-scattered light EL3 having been emitted from the wavelength conversion element 25 is collimated by the first pickup optical system 26 and then enters the second optical element 30. The back-scattered light EL3 is a part of the excitation light EL, and is therefore reflected toward the +X side in the second optical element 30.

The back-scattered light EL3 having been reflected by the second optical element 30 enters the reflecting element 40. The reflecting element 40 reflects the back-scattered light EL3 which has been emitted from the wavelength conversion element 25 and enters the reflecting element 40 via the second optical element 30. The reflecting element 40 is formed of, for example, a metal mirror or a dielectric mirror.

The reflecting element 40 reflects the back-scattered light EL3 toward the −X side. The back-scattered light EL3 having been reflected by the reflecting element 40 is reflected by the second optical element 30 once again, and then enters the wavelength conversion element 25 via the first pickup optical system 26. At least a part of the back-scattered light EL3 having entered the wavelength conversion element 25 enters the phosphor layer 251, and is then reused for generation of the fluorescence YL.

Advantages of Sixth Embodiment

According to the light source device 2D related to the present embodiment, when the back-scattered light EL3 is emitted from the opening part 260 of the wavelength conversion element 25, it is possible to return the back-scattered light EL3 to the wavelength conversion element 25 side using the reflecting element 40. Thus, since the back-scattered light EL3 is used for re-excitation of the fluorescence YL, it is possible to provide the light source device in which the light use efficiency of the excitation light EL emitted from the light source 22 is increased.

The reflecting element 40 in the present embodiment can be applied to all of the configurations of the third through fifth embodiments.

It should be noted that the although the description is presented illustrating the embodiments of the present disclosure, the present disclosure is not necessarily limited to the embodiments described above, but a variety of modifications can be added within the scope or the spirit of the present disclosure.

First Modified Example

Another configuration in the wavelength conversion element will be described as a first modified example.

Figure 12:
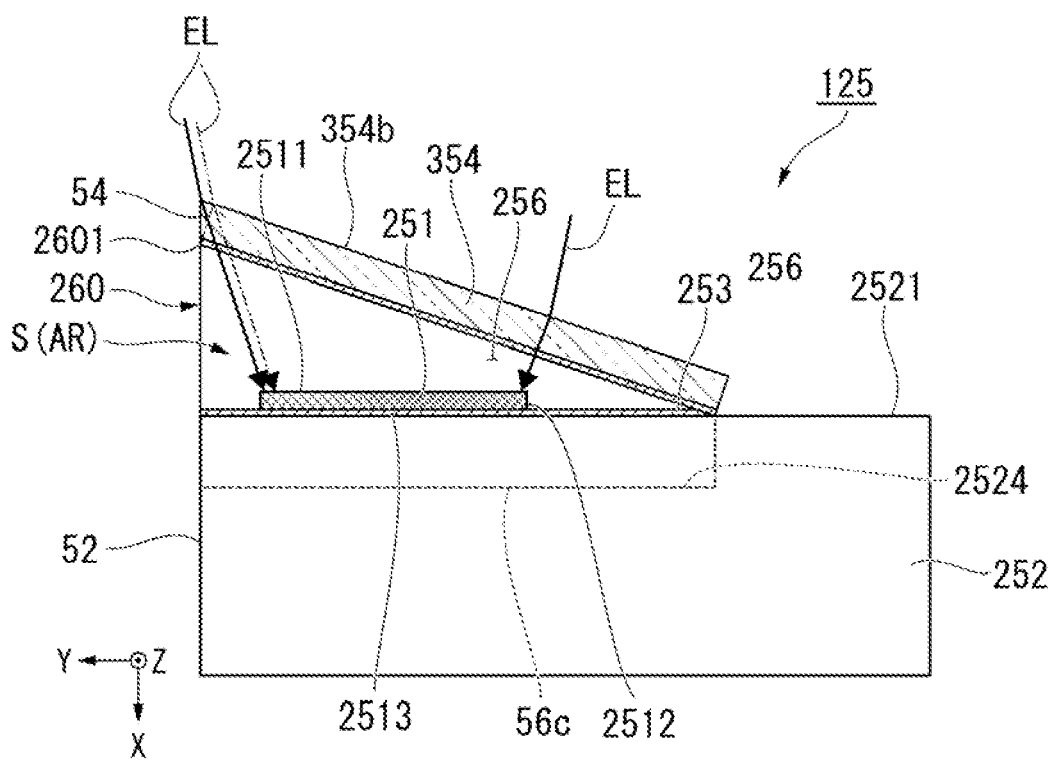
FIG. 12 is a cross-sectional view showing a configuration of a wavelength conversion element according to a first modified example.

FIG. 12 is a cross-sectional view showing a configuration related to the wavelength conversion element according to the present modified example. FIG. 12 is a cross-sectional view corresponding to FIG. 5.

It should be noted that in the present modified example, constituents or members common to any of the embodiments will be denoted by the same reference symbols, and the detailed description thereof will be omitted.

As shown in FIG. 12, a wavelength conversion element 125 in the present modified example is provided with the phosphor layer 251, the substrate 252, the fourth optical layer 253, a first optical member 354, a second optical member not shown, and the third optical member 256.

In the case of the present modified example, an end surface 54 located at the opening part 260 side (the +Y side) of the first optical member 354 is formed so as to be coplanar with an opening end 2601 located at the −X side of the opening part 260. In other words, the end surface 54 is formed of a surface obliquely cut with respect to a thickness direction of the first optical member 354. In the present embodiment, the end surface 54 is a surface along a direction crossing with respect to a direction perpendicular to an obverse surface 354b at the −X side of the first optical member 354.

Here, the end surface 54 of the first optical member 354 is a cut surface (a processed surface), and is therefore made frosted, and is provided with a light scattering property. Therefore, it is difficult to use the end surface 54 as the plane of incidence of the excitation light EL.

According to the configuration of the present modified example, by making the end surface 54 of the first optical member 354 coplanar with the opening end 2601 of the opening part 260, it is possible to expand the area which effectively functions as the plane of incidence of the excitation light EL out of the obverse surface 354b of the first optical member 354 toward the +Y side compared to the end surface position of the first optical member in the embodiments described above represented by the dashed-two dotted line. In other words, it is possible to expand the effective diameter of the excitation light EL which can enter the phosphor layer 251. Therefore, since the use efficiency of the excitation light EL increases, it is possible to increase the luminance of the fluorescence YL generated in the phosphor layer 251.

Second Modified Example

Then, another configuration in the wavelength conversion element will be described as a second modified example.

Figure 13A:
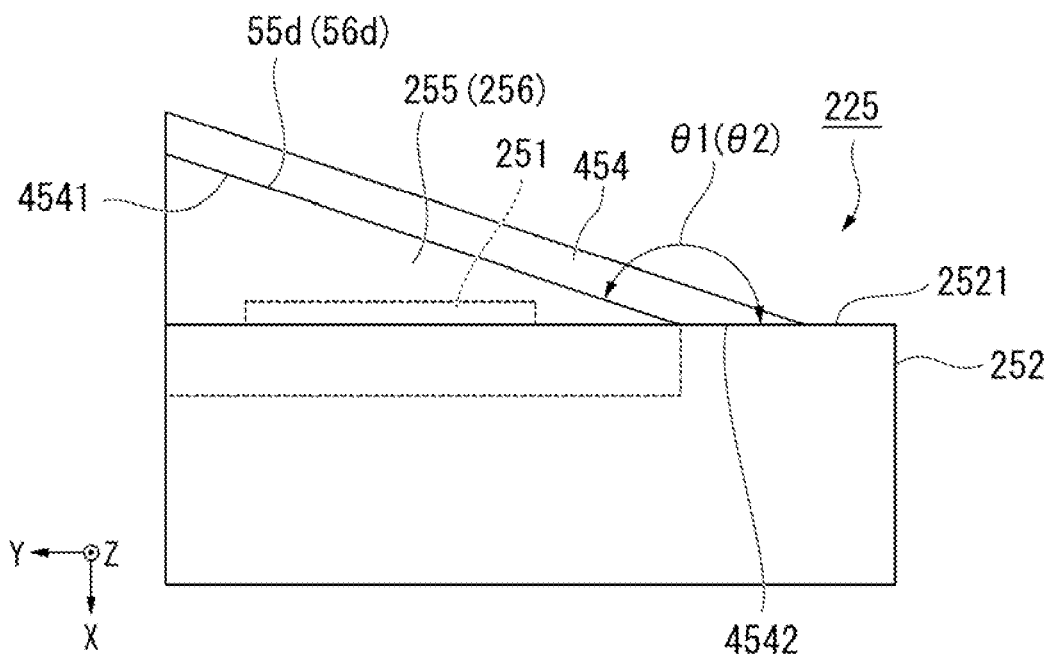
FIG. 13A is a side view showing a configuration of a wavelength conversion element according to a second modified example.
Figure 13B:
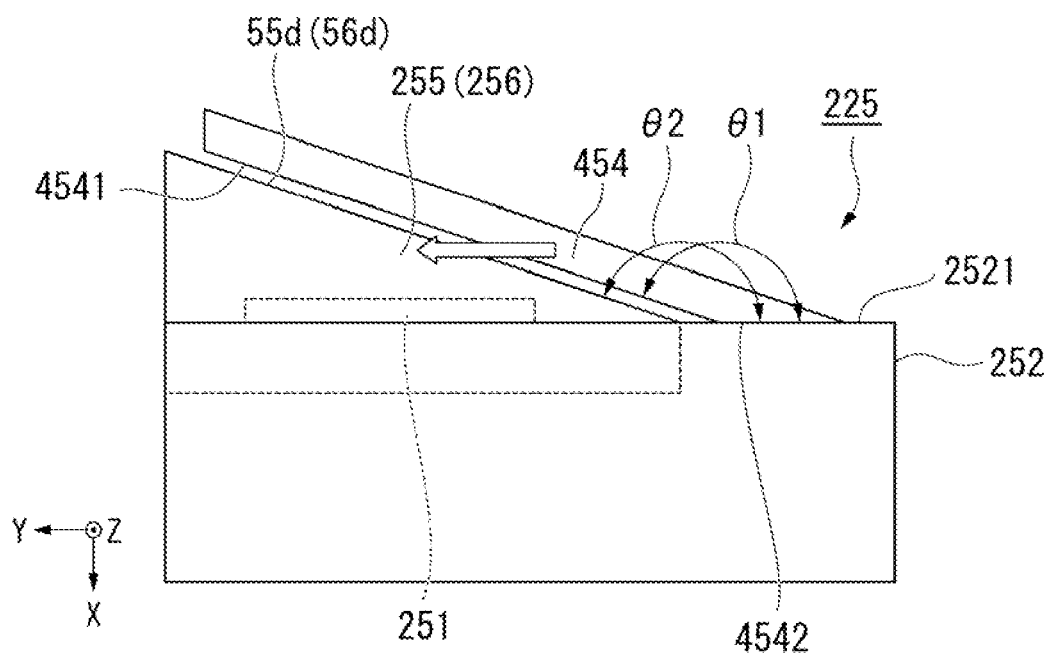
FIG. 13B is an explanatory diagram of a function of the wavelength conversion element according to the second modified example.

FIG. 13A is a side view showing a configuration related to the wavelength conversion element according to the present modified example. FIG. 13B is a diagram for explaining an operation of the present modified example. It should be noted that in the present modified example, constituents or members common to any of the embodiments will be denoted by the same reference symbols, and the detailed description thereof will be omitted.

As shown in FIG. 13A, a wavelength conversion element 225 in the present modified example is provided with the phosphor layer 251, the substrate 252, a first optical member 454, the second optical member 255, and the third optical member 256.

The first optical member 454 in the present modified example has a configuration obtained by further modifying the first optical member 354 in the first modified example. Specifically, the first optical member 454 in the present modified example has a first contact surface 4541 making contact with the second optical member 255 and the third optical member 256, and a second contact surface 4542 making contact with the support surface 2521 of the substrate 252. The first contact surface 4541 is an inner surface located inside the first optical member 454. The first contact surface 4541 is a surface opposed to the housing space S, and opposed to the phosphor layer 251. The second contact surface 4542 is an end surface located at the −Y side in the first optical member 454. The second contact surface 4542 is formed of a surface obliquely cut with respect to a thickness direction of the first optical member 454. In the present modified example, the second contact surface 4542 is a surface along a direction crossing with respect to a direction perpendicular to the first contact surface 4541 of the first optical member 454.

An angle θ1 formed between the first contact surface 4541 and the second contact surface 4542 is equal to an angle θ2 formed between the support surface 2521 of the substrate 252 and a contact surface (the fourth end surface 55d or the fourth end surface 56d) of the second optical member 255 or the third optical member 256 with respect to the first optical member 454.

According to this configuration, as shown in FIG. 13B, by moving first optical member 454 toward the +Y side until the first contact surface 4541 makes contact with the fourth end surface 55d and the fourth end surface 56d in the state in which the second contact surface 4542 has contact with the support surface 2521, it is possible to easily and accurately perform the alignment of the first optical member 454 with respect to the second optical member 255 and the third optical member 256. Therefore, according to the wavelength conversion element 225 related to the present modified example, it is possible to reduce the manufacturing cost by enhancing easiness in assembly.

Third Modified Example

Then, another configuration in the first optical element will be described as a third modified example.

Figure 14:
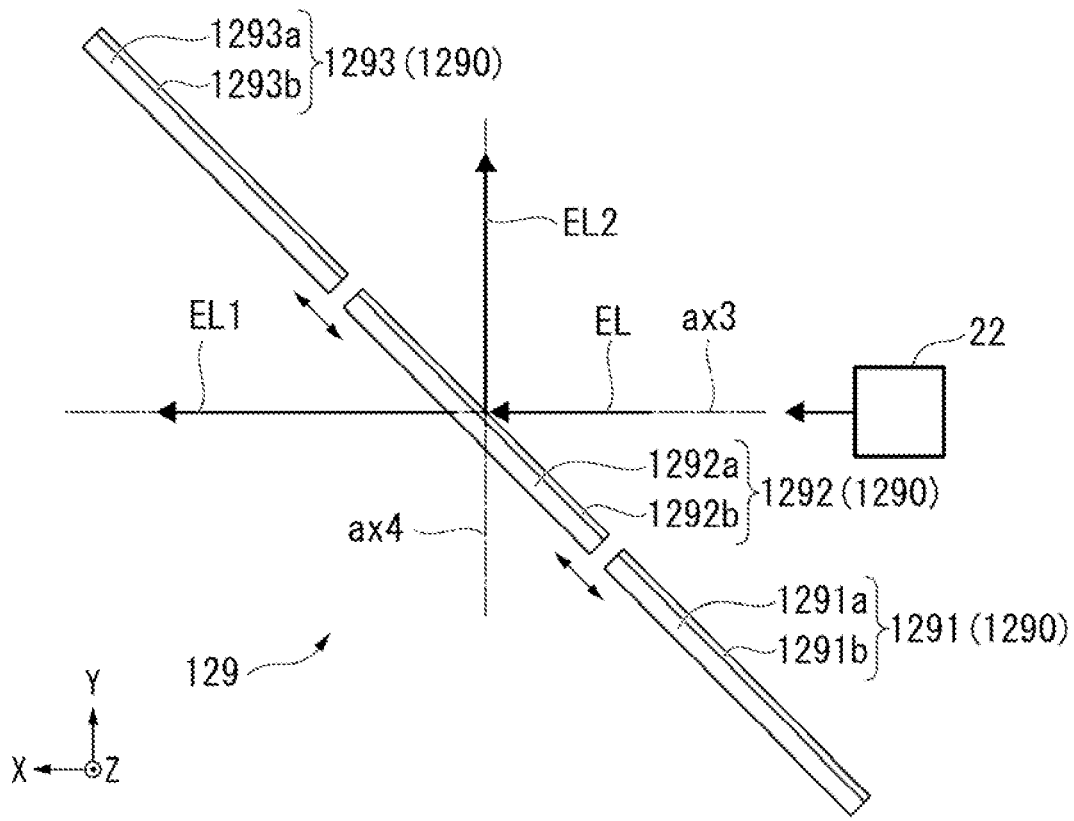
FIG. 14 is a cross-sectional view showing a configuration of a first optical element according to a third modified example.

FIG. 14 is a cross-sectional view showing the configuration of the first optical element in the present modified example. It should be noted that in the present modified example, constituents or members common to any of the embodiments will be denoted by the same reference symbols, and the detailed description thereof will be omitted.

As shown in FIG. 14, a first optical element 129 in the present modified example has a plurality of optical members 1290. In the case of the present modified example, the plurality of optical members 1290 includes an optical member 1291, an optical member 1292, and an optical member 1293. It should be noted that the number of the optical members 1290 is not limited thereto, but can be two, or four or more.

The optical element 1291, the optical member 1292, and the optical member 1293 are each an element which transmits a part of the excitation light EL, and reflects another part of the excitation light EL. The optical member 1291 includes a light transmissive substrate 1291a and a half mirror layer 1291b. The optical member 1292 includes a light transmissive substrate 1292a and a half mirror layer 1292b. The optical member 1293 includes a light transmissive substrate 1293a and a half mirror layer 1293b. The light transmissive substrates 1291a, 1292a, and 1293a are each a substrate having a light transmissive property with respect to the excitation light EL. The half mirror layers 1291b, 1292b, and 1293b are formed of dielectric multilayer films deposited on the light transmissive substrates 1291a, 1292a, and 1293a, respectively. In the case of the present modified example, the half mirror layers 1291b, 1292b, and 1293b are different in ratio between an amount of transmitted light and an amount of reflected light in the excitation light EL from each other. Therefore, the optical members 1291, 1292, and 1293 are different in reflectance or transmittance with respect to the excitation light EL from each other. In the case of the present modified example, the reflectance with respect to the excitation light EL increases in the order of, for example, the optical members 1291, 1292, and 1293.

In the first optical element 129 in the present modified example, the optical members 1291, 1292, and 1293 are respectively held by drive sections not shown. Thus, it is possible for the first optical element 129 to independently replace the optical members 1291, 1292, and 1293 with each other in the light path of the excitation light EL. In other words, it is possible for the first optical element 129 to dispose any one of the optical members 1291, 1292, and 1293 on the light path of the excitation light EL. The optical members 1291, 1292, and 1293 are disposed on the light path of the excitation light EL so as to form an angle of 45° with each of the optical axis ax3 and the optical axis ax4.

Thus, it is possible for the first optical element 129 in the present modified example to change the ratio between the amount of transmitted light and the amount of reflected light in the excitation light EL.

It should be noted that as the timing of replacing the optical members 1291, 1292, and 1293 with each other, there can be cited, for example, when a temperature change or deterioration of the light source 22 is detected, when a total operation time of the light source 22 exceeds a threshold value, or when deterioration of the phosphor layer 251 is detected.

Hereinafter, there will be described when the first optical element 129 in the present modified example is applied to the light source device 2 according to the second embodiment.

The first optical element 129 disposes the optical member 1291 the lowest in reflectance on the light path of the excitation light EL when relatively decreasing the amount of reflected light of the excitation light EL, and relatively increasing the amount of transmitted light of the excitation light EL. Thus, it is possible for the excitation light EL having entered the optical member 1291 to generate a larger amount of the excitation light EL1 as the transmitted light proceeding toward the X direction than the amount of the blue light EL2 as the reflected light proceeding toward the Y direction.

Further, in the first optical element 129, the optical member 1293 the highest in reflectance on the light path of the excitation light EL when relatively increasing the amount of reflected light of the excitation light EL, and relatively decreasing the amount of transmitted light of the excitation light EL. Thus, it is possible for the excitation light EL having entered the optical member 1293 to generate a larger amount of the blue light EL2 as the reflected light proceeding toward the Y direction than the amount of the excitation light EL1 as the transmitted light proceeding toward the X direction.

It should be noted that in the first optical element 129, when making a difference in amount of light between the excitation light EL1 and the blue light EL2 small, it is sufficient to dispose the optical member 1292 on the light path of the excitation light EL.

As described above, according to the first optical element 129 in the present modified example, by replacing the optical members 1291, 1292, and 1293 with each other in the light path of the excitation light EL, it is possible to change the ratio between the excitation light EL1 entering the wavelength conversion element 25 and the blue light EL2 entering the diffusion element 31. Thus, it is possible to control a color balance (a white balance) of the illumination light WL by changing the ratio between the diffused blue light BL and the fluorescence YL.

Fourth Modified Example

Then, another configuration of the first optical element will be described as a fourth modified example.

Figure 15A:
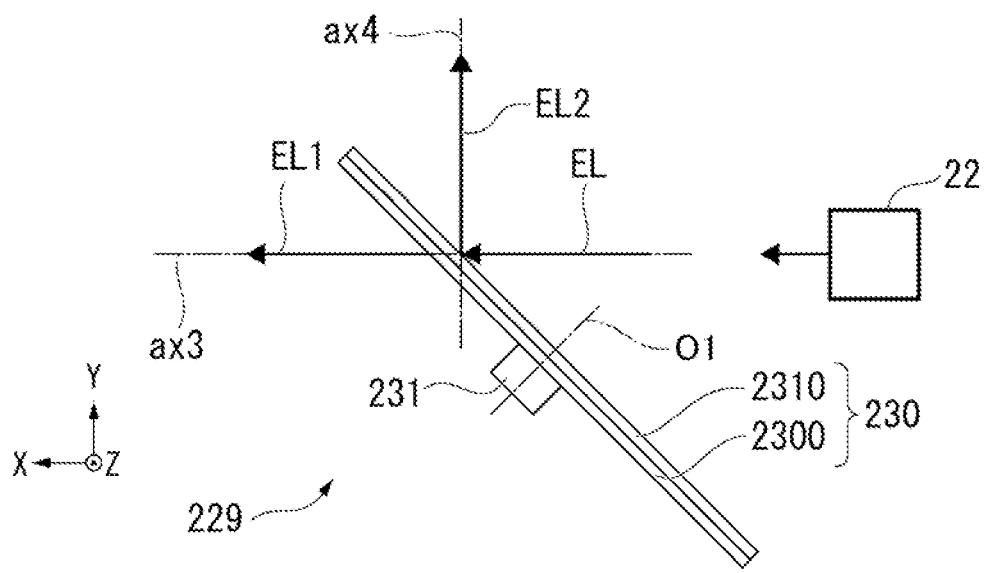
FIG. 15A is a cross-sectional view showing a configuration of a first optical element according to a fourth modified example.

FIG. 15A is a cross-sectional view showing the configuration of the first optical element in the present modified example. It should be noted that in the present modified example, constituents or members common to any of the embodiments will be denoted by the same reference symbols, and the detailed description thereof will be omitted.

As shown in FIG. 15A, a first optical element 229 in the present modified example is disposed on the light path of the excitation light EL so as to form an angle of 45° with each of the optical axis ax3 and the optical axis ax4. The first optical element 229 in the present modified example includes an optical substrate 230, and a motor (a drive section) 231 for rotating the optical substrate 230. The optical substrate 230 transmits apart of the excitation light EL toward the X direction, and reflects another part of the excitation light EL toward the Y direction. The optical substrate 230 includes a light transmissive substrate 2300 and a half mirror layer 2310.

A rotational axis O1 of the motor 231 is arranged so as to form an angle of 45° with the optical axis ax3 and the optical axis ax4. Thus, the first optical element 229 makes it possible to rotate the plane of incidence of light of the optical substrate 230 in a plane forming an angle of 45° with the optical axes ax3, ax4. The optical substrate 230 is formed to have, for example, a circular shape when viewed from a direction of the rotational axis O1, but the shape of the optical substrate 230 is not limited to a circular disk.

Figure 15B:
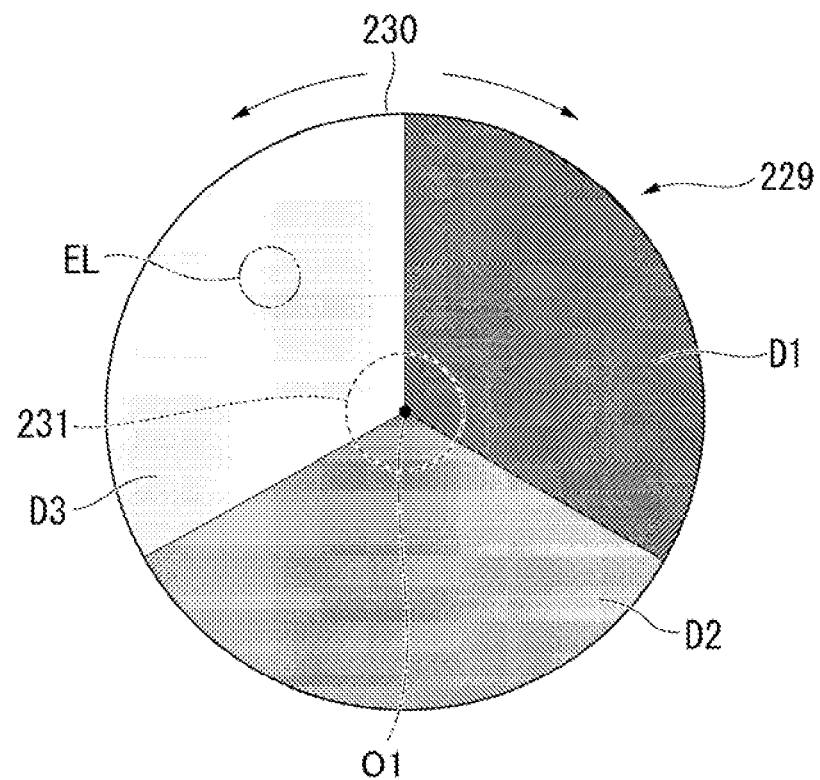
FIG. 15B is a plan view showing the configuration of the first optical element according to the fourth modified example.

FIG. 15B is a plan view of the first optical element according to the present modified example. FIG. 15B is a plan view of the first optical element 229 viewed from the direction along the rotational axis O1. Hereinafter, a direction along the periphery of the rotational axis O1 viewed from the direction along the rotational axis O1 is referred to as a radial direction in some cases.

As shown in FIG. 15B, in the first optical element 229 in the present modified example, the optical substrate 230 includes a plurality of incident areas which the excitation light EL enters. In the case of the present modified example, the plurality of incident areas includes a first incident area D1, a second incident area D2, and a third incident area D3. The first incident area D1, the second incident area D2, and the third incident area D3 are disposed in the optical substrate 230 so as to be different in position in the radial direction from each other. It should be noted that in the present modified example, there is described when there are three light incident areas, but the number of the light incident areas is not limited thereto.

The first incident area D1, the second incident area D2, and the third incident area D3 are different in reflectance or transmittance with respect to the excitation light EL from each other. In the case of the present modified example, by making the configurations of the half mirror layer 2310 corresponding respectively to the first incident area D1, the second incident area D2, and the third incident area D3 different from each other, the reflectance with respect to the excitation light EL is made to increase in the order of, for example, the first incident area D1, the second incident area D2, and the third incident area D3.

In the first optical element 229 in the present modified example, it is possible to switch the first incident area D1, the second incident area D2, and the third incident area D3 to be located on the light path of the excitation light EL by rotating the optical substrate 230 with the motor 231. In other words, it is possible for the first optical element 229 to dispose any one of the first incident area D1, the second incident area D2, and the third incident area D3 on the light path of the excitation light EL. The first incident area D1, the second incident area D2, and the third incident area D3 are arranged on the light path of the excitation light EL so as to form an angle of 45° with each of the optical axis ax3 and the optical axis ax4.

Thus, it is possible for the first optical element 229 in the present modified example to change the ratio between the amount of transmitted light and the amount of reflected light in the excitation light EL.

It should be noted that as the timing of rotating the optical substrate 230, there can be cited, for example, when a temperature change or deterioration of the light source 22 is detected, when a total operation time of the light source 22 exceeds a threshold value, or when deterioration of the phosphor layer 251 is detected.

Hereinafter, there will be described when the first optical element 229 in the present modified example is applied to the light source device 2 according to the second embodiment.

The first optical element 229 positions the first incident area D1 the lowest in reflectance on the light path of the excitation light EL when relatively decreasing the amount of reflected light of the excitation light EL, and relatively increasing the amount of transmitted light of the excitation light EL. Thus, it is possible for the excitation light EL having entered the first incident area D1 to generate a larger amount of the excitation light EL1 as the transmitted light proceeding toward the X direction than the amount of the blue light EL2 as the reflected light proceeding toward the Y direction.

Further, in the first optical element 229, the third incident area D3 the highest in reflectance on the light path of the excitation light EL when relatively increasing the amount of reflected light of the excitation light EL, and relatively decreasing the amount of transmitted light of the excitation light EL. Thus, it is possible for the excitation light EL having entered the third incident area D3 to generate a larger amount of the blue light EL2 as the reflected light proceeding toward the Y direction than the amount of the excitation light EL1 as the transmitted light proceeding toward the X direction.

It should be noted that in the first optical element 229, when making a difference in amount of light between the excitation light EL1 and the blue light EL2 small, it is sufficient to dispose the second incident area D2 on the light path of the excitation light EL.

As described above, according to the first optical element 229 in the present modified example, by rotating the optical substrate 230 with the motor 231, it is possible to change the ratio between the excitation light EL1 entering the wavelength conversion element 25 and the blue light EL2 entering the diffusion element 31. Thus, it is possible to control a color balance (a white balance) of the illumination light WL by changing the ratio between the diffused blue light BL and the fluorescence YL.

Fifth Modified Example

In the fourth modified example, there is cited when the first incident area D1, the second incident area D2, and the third incident area D3 different in reflectance with respect to the excitation light EL from each other are sequentially arranged in the radial direction of the optical substrate 230 as an example, but the configuration of the first optical element is not limited thereto. The present modified example is different in the point that the reflectance with respect to the excitation light EL is continuously changed from the second modified example. It should be noted that in the present modified example, constituents or members common to the fourth modified example described above will be denoted by the same reference symbols, and the detailed description thereof will be omitted.

Figure 16:
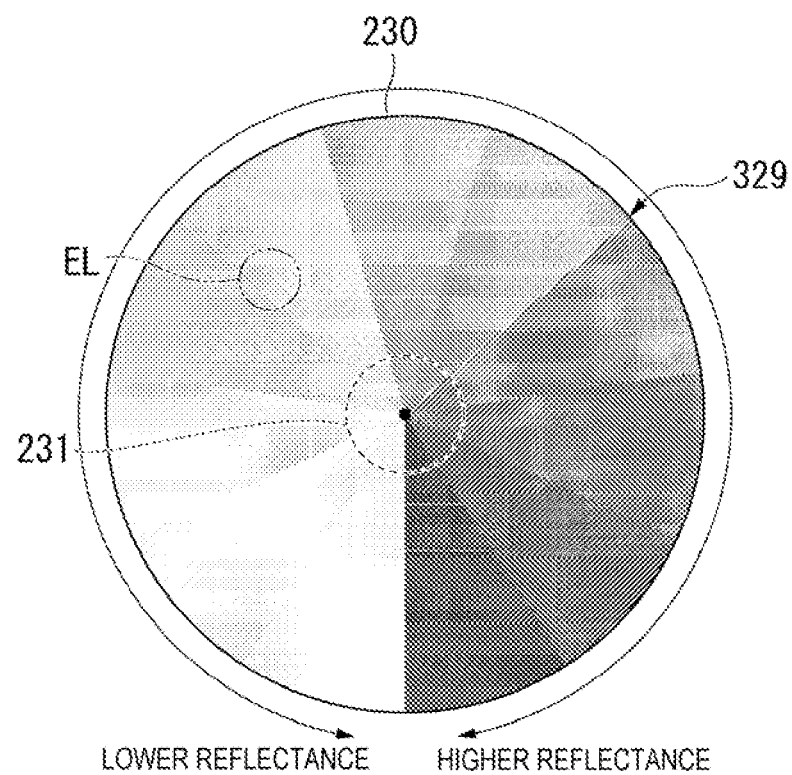
FIG. 16 is a plan view showing a configuration of a first optical element according to a fifth modified example.

FIG. 16 is a plan view showing the configuration of the first optical element in the present modified example.

As shown in FIG. 16, the first optical element 329 in the present modified example has a configuration in which the reflectance with respect to the excitation light EL is continuously changed in the radial direction of the plane of incidence of light of the optical substrate 230. According to this configuration, it is possible to rotate the optical substrate 230 with the motor 231 to switch the plane of incidence of light located on the light path of the excitation light EL. Thus, it is possible for the first optical element 329 in the present modified example to change the ratio between the amount of transmitted light and the amount of reflected light in the excitation light EL.

According to the first optical element 329 in the present modified example, by rotating the optical substrate 230 with the motor 231, it is possible to more finely change the ratio between the excitation light EL1 entering the wavelength conversion element 25 and the blue light EL2 entering the diffusion element 31. Therefore, according to the present modified example, it is possible to more precisely control the color balance (the white balance) of the illumination light WL. Therefore, it is possible to provide the light source device excellent in color reproducibility by using the first optical element 329 in the present modified example.

Further, in the embodiments and the modified examples described above, there is cited when the width in the Z direction of the reverse surface 2513 of the phosphor layer 251 is narrower than the width in the Z direction of the support surface 2521 located in the housing space S as an example, but the width in the Z direction of the reverse surface 2513 of the phosphor layer 251 and the width in the Z direction of the support surface 2521 located in the housing space S can be the same. In this case, since the side surfaces 2512 of the phosphor layer 251 become in the state of having contact with the second optical member 255 and the third optical member 256, the fluorescence YL emitted from the side surfaces 2512 is reflected by the second optical member 255 and the third optical member 256 to be returned to the inside of the phosphor layer 251.

Further, although in the embodiments and the modified examples described above, there are illustrated the projectors 1, 1A provided with the three light modulation devices 4R, 4G, and 4B, the present disclosure can also be applied to a projector for displaying a color picture with a single light modulation device. Further, the light modulation device is not limited to the liquid crystal panel described above, but a digital mirror device, for example, can also be used.

Further, although in the embodiments and the modified examples described above, there is described the example of applying the light source device according to the present disclosure to the projector, this is not a limitation. The light source device according to the present disclosure can also be applied to lighting equipment such as a headlight for a vehicle.

It is also possible for the wavelength conversion element according to an aspect of the present disclosure to have the following configuration.

The wavelength conversion element according to an aspect of the present disclosure includes a wavelength conversion layer which has a plane of incidence of light, and is configured to perform a wavelength conversion on light in a first wavelength band having entered the plane of incidence of light to generate light in a second wavelength band different from the first wavelength band, a substrate having a support surface configured to support the wavelength conversion layer, a first optical member which has a first optical layer configured to transmit the light in the first wavelength band and reflect the light in the second wavelength band, and in which the first optical layer is arranged so as to be opposed to the support surface, a second optical member which has a second optical layer configured to reflect at least the light in the second wavelength band, and in which the second optical layer is arranged so as to cross the support surface and the first optical layer, a third optical member which has a third optical layer configured to reflect at least the light in the second wavelength band, and in which the third optical layer is arranged so as to cross the support surface and the first optical layer, and so as to be opposed to the second optical layer, and an opening part constituted by the substrate, the first optical member, the second optical member, and the third optical member, wherein an area of the plane of incidence of light of the wavelength conversion layer is larger than an area of a light incident area which the light in the first wavelength band enters in the plane of incidence of light, the area of the light incident area is larger than an area of the opening part, and the light in the second wavelength band is emitted from the opening part.

In the wavelength conversion element according to the aspect of the present disclosure, there may be adopted a includes a scattering body configured to scatter light.

In the wavelength conversion element according to the aspect of the present disclosure, there may be adopted a configuration in which an angle formed between a plane along the first optical layer and a plane along the plane of incidence of light of the wavelength conversion layer is no smaller than 10° and no larger than 40°.

In the wavelength conversion element according to the aspect of the present disclosure, there may be adopted a configuration in which the second optical layer reflects the light in the first wavelength band and the light in the second wavelength band, and the third optical layer reflects the light in the first wavelength band and the light in the second wavelength band.

In the wavelength conversion element according to the aspect of the present disclosure, there may be adopted a configuration in which the substrate has a fourth optical layer disposed between the support surface and the wavelength conversion layer.

In the wavelength conversion element according to the aspect of the present disclosure, there may be adopted a configuration in which the fourth optical layer is disposed in at least a part of a periphery of the wavelength conversion layer on the support surface.

In the wavelength conversion element according to the aspect of the present disclosure, there may be adopted a configuration in which the first optical member is arranged so as not to have contact with the wavelength conversion layer.

In the wavelength conversion element according to the aspect of the present disclosure, there may be adopted a configuration in which the wavelength conversion layer is housed in a housing space disposed inside the opening part, and an air layer is disposed in the housing space.

A light source device according to an aspect of the present disclosure may have the following configuration.

The light source device according to the aspect of the present disclosure includes a light source, and the wavelength conversion element according to the above aspect of the present disclosure.

A light source device according to another aspect of the present disclosure may have the following configuration.

The light source device according to the aspect of the present disclosure includes a light source configured to emit light in a first wavelength band, a first optical element which the light in the first wavelength band enters, and which is configured to transmit a part of the light in the first wavelength band and reflect another part of the light in the first wavelength band, a wavelength conversion element which either one of the one of the light in the first wavelength band and the another of the light in the first wavelength band enters, and which is configured to perform a wavelength conversion on the light in the first wavelength band to emit at least light in a second wavelength band different from the first wavelength band, a diffusion element which another of the one of the light in the first wavelength band and the another of the light in the first wavelength band enters, and which is configured to diffuse the light in the first wavelength band, and a second optical element configured to combine the light in the second wavelength band emitted from the wavelength conversion element and the light in the first wavelength band emitted from the diffusion element with each other, wherein the wavelength conversion element includes a wavelength conversion layer which has a plane of incidence of light, and is configured to perform a wavelength conversion on the light in the first wavelength band having entered the plane of incidence of light to generate the light in the second wavelength band, a substrate having a support surface configured to support the wavelength conversion layer, a first optical member which has a first optical layer configured to transmit the light in the first wavelength band and reflect the light in the second wavelength band, and in which the first optical layer is arranged so as to be opposed to the support surface, a second optical member which has a second optical layer configured to reflect at least the light in the second wavelength band, and in which the second optical layer is arranged so as to cross the support surface and the first optical layer, a third optical member which has a third optical layer configured to reflect at least the light in the second wavelength band, and in which the third optical layer is arranged so as to cross the support surface and the first optical layer, and so as to be opposed to the second optical layer, and an opening part constituted by the substrate, the first optical member, the second optical member, and the third optical member, an area of the plane of incidence of light of the wavelength conversion layer is larger than an area of a light incident area which the light in the first wavelength band enters in the plane of incidence of light, the area of the light incident area is larger than an area of the opening part, and the light in the second wavelength band is emitted from the opening part.

In the light source device according to the aspect of the present disclosure, there may be adopted a configuration in which the first optical element is configured to change a ratio between an amount of transmitted light of the light in the first wavelength band and an amount of reflected light of the light in the first wavelength band with respect to the light in the first wavelength band.

In the light source device according to the aspect of the present disclosure, there may be adopted a configuration in which the first optical element has a plurality of optical members different in the ratio from each other, and the plurality of optical members is replaced with each other with respect to a light path of the light in the first wavelength band emitted from the light source.

In the light source device according to the aspect of the present disclosure, there may be adopted a configuration in which the first optical element has an optical substrate including a plurality of light incident areas different in the ratio from each other, and a drive section, the optical substrate is disposed so that the light in the first wavelength band emitted from the light source enters at least one of the light incident areas, and the drive section rotates the optical substrate to switch between the light incident areas.

In the light source device according to the aspect of the present disclosure, there may be adopted a configuration in which the first optical element includes a light transmissive substrate, and a dielectric multilayer film provided to the light transmissive substrate.

In the light source device according to the aspect of the present disclosure, there may be adopted a configuration in which the second optical element includes one of a dichroic mirror configured to transmit the light in the second wavelength band and reflect the light in the first wavelength band, and a dichroic mirror configured to reflect the light in the second wavelength band and transmit the light in the first wavelength band.

In the light source device according to the aspect of the present disclosure, there may be adopted a configuration in which the first optical element branches the light in the first wavelength band entering the first optical element from the light source into a component proceeding in a first direction along a virtual plane in which the light source, the first optical element, and the second optical element are arranged, and a component proceeding in a second direction which is perpendicular to the first direction, and is along the virtual plane, the diffusion element reflects the component branched from the first optical element in the second direction to enter the diffusion element toward the first direction, and the wavelength conversion element performs a wavelength conversion on the component branched from the first optical element in the first direction to enter the wavelength conversion element, and then emits the light in the second wavelength band toward the second direction.

In the light source device according to the aspect of the present disclosure, there may be adopted a configuration in which the second optical element reflects a part of the light in the first wavelength band which is emitted in the first direction from the diffusion element to enter the second optical element toward the second direction, and transmits the light in the second wavelength band which is emitted in the second direction from the wavelength conversion element to enter the second optical element toward the second direction to combine the part of the light in the first wavelength band and the light in the second wavelength band with each other.

In the light source device according to the aspect of the present disclosure, there may be adopted a configuration in which the first optical element branches the light in the first wavelength band entering the first optical element from the light source into a component proceeding in a first direction along a virtual plane in which the light source, the first optical element, and the second optical element are arranged, and a component proceeding in a second direction which is perpendicular to the first direction, and is along the virtual plane, the diffusion element reflects the component branched from the first optical element in the first direction to enter the diffusion element toward the second direction, and the wavelength conversion element performs a wavelength conversion on the component branched from the first optical element in the second direction to enter the wavelength conversion element, and then emits the light in the second wavelength band toward the first direction.

In the light source device according to the aspect of the present disclosure, there may be adopted a configuration in which the second optical element transmits a part of the light in the first wavelength band which is emitted in the second direction from the diffusion element to enter the second optical element toward the second direction, and reflects the light in the second wavelength band which is emitted in the first direction from the wavelength conversion element to enter the second optical element toward the second direction to combine the part of the light in the first wavelength band and the light in the second wavelength band with each other.

In the light source device according to the aspect of the present disclosure, there may be adopted a configuration further including a mirror, wherein the first optical element branches the light in the first wavelength band entering the first optical element from the light source into a component proceeding in a first direction along a virtual plane in which the light source, the first optical element, and the second optical element are arranged, and a component proceeding in a second direction which is perpendicular to the first direction, and is along the virtual plane, the mirror reflects the component branched from the first optical element in the second direction to enter the mirror toward the first direction, the diffusion element transmits the light which is reflected toward the first direction from the mirror to enter the diffusion element toward the first direction, and the wavelength conversion element performs a wavelength conversion on the component branched from the first optical element in the first direction to enter the wavelength conversion element, and then emits the light in the second wavelength band toward the second direction.

In the light source device according to the aspect of the present disclosure, there may be adopted a configuration in which the second optical element reflects a part of the light in the first wavelength band which is emitted in the first direction from the diffusion element to enter the second optical element toward the second direction, and transmits the light in the second wavelength band which is emitted in the second direction from the wavelength conversion element to enter the second optical element toward the second direction to combine the part of the light in the first wavelength band and the light in the second wavelength band with each other.

In the light source device according to the aspect of the present disclosure, there may be adopted a configuration further including a mirror, wherein the first optical element branches the light in the first wavelength band entering the first optical element from the light source into a component proceeding in a first direction along a virtual plane in which the light source, the first optical element, and the second optical element are arranged, and a component proceeding in a second direction which is perpendicular to the first direction, and is along the virtual plane, the mirror reflects the component branched from the first optical element in the first direction to enter the mirror toward the second direction, the diffusion element transmits the light which is reflected toward the second direction from the mirror to enter the diffusion element toward the second direction, and the wavelength conversion element performs a wavelength conversion on the component branched from the first optical element in the second direction to enter the wavelength conversion element, and then emits the light in the second wavelength band toward the first direction.

In the light source device according to the aspect of the present disclosure, there may be adopted a configuration in which the second optical element transmits a part of the light in the first wavelength band which is emitted in the second direction from the diffusion element to enter the second optical element toward the second direction, and reflects the light in the second wavelength band which is emitted in the first direction from the wavelength conversion element to enter the second optical element toward the second direction to combine the part of the light in the first wavelength band and the light in the second wavelength band with each other.

In the light source device according to the aspect of the present disclosure, there may be adopted a configuration further including a reflecting element configured to reflect the light in the first wavelength band which is emitted from the wavelength conversion element and enters the reflecting element via the second optical element.

In the light source device according to the aspect of the present disclosure, there may be adopted a configuration in which the wavelength conversion layer includes a scattering body configured to scatter light.

In the light source device according to the aspect of the present disclosure, there may be adopted a configuration in which an angle formed between a plane along the first optical layer and a plane along the plane of incidence of light of the wavelength conversion layer is no smaller than 10° and no larger than 40°.

In the light source device according to the aspect of the present disclosure, there may be adopted a configuration in which the second optical layer reflects the light in the first wavelength band and the light in the second wavelength band, and the third optical layer reflects the light in the first wavelength band and the light in the second wavelength band.

In the light source device according to the aspect of the present disclosure, there may be adopted a configuration in which the substrate has a fourth optical layer disposed between the support surface and the wavelength conversion layer.

In the light source device according to the aspect of the present disclosure, there may be adopted a configuration in which the fourth optical layer is disposed in at least a part of a periphery of the wavelength conversion layer on the support surface.

In the light source device according to the aspect of the present disclosure, there may be adopted a configuration in which the first optical member is arranged so as not to have contact with the wavelength conversion layer.

In the light source device according to the aspect of the present disclosure, there may be adopted a configuration in which the wavelength conversion layer is housed in a housing space disposed inside the opening part, and an air layer is disposed in the housing space.

A projector according to an aspect of the present disclosure may have the following configuration.

The projector according to an aspect of the present disclosure includes the light source device according to one of the above aspects of the present disclosure, a light modulation device configured to modulate light from the light source device in accordance with image information, and a projection optical device configured to project the light modulated by the light modulation device.

What is claimed is:

1. A wavelength conversion element comprising:
   a wavelength conversion layer having a light incident surface, the wavelength conversion layer being configured to convert a first light which has a first wavelength band and is incident on the light incident surface into a second light which has a second wavelength band different from the first wavelength band;
   a substrate having a support surface configured to support the wavelength conversion layer;
   a first optical member having a first optical layer configured to transmit the first light and reflect the second light, the first optical layer facing the support surface;
   a second optical member having a second optical layer configured to reflect the second light, the second optical layer crossing the support surface and the first optical layer; and
   a third optical member having a third optical layer configured to reflect the second light, the third optical layer crossing the support surface and the first optical layer and facing the second optical layer, wherein
   an opening is formed by the substrate, the first optical member, the second optical member, and the third optical member,
   a first area of the light incident surface of the wavelength conversion layer is larger than a second area of a light incident area on which the first light is incident in the light incident surface,
   the second area of the light incident area is larger than a third area of the opening, and
   the second light is emitted from the opening.

2. The wavelength conversion element according to claim 1, wherein
   the wavelength conversion layer includes a scattering body configured to scatter light.

3. The wavelength conversion element according to claim 1, wherein
   an angle formed between a plane along the first optical layer and a plane along the light incident surface of the wavelength conversion layer is no smaller than 10° and no larger than 40°.

4. The wavelength conversion element according to claim 1, wherein
   the second optical layer reflects the first light and the second light, and
   the third optical layer reflects the first light and the second light.

5. The wavelength conversion element according to claim 1, wherein
   the substrate has a fourth optical layer disposed between the support surface and the wavelength conversion layer.

6. The wavelength conversion element according to claim 5, wherein
   the fourth optical layer is disposed in at least a part of a periphery of the wavelength conversion layer on the support surface.

7. The wavelength conversion element according to claim 1, wherein
   the first optical member is arranged so as not to have contact with the wavelength conversion layer.

8. The wavelength conversion element according to claim 1, wherein
the wavelength conversion layer is housed in a housing space disposed inside the opening, and
an air layer is disposed in the housing space.

9. A light source device comprising:
a light source configured to emit the first light; and
the wavelength conversion element according to claim 1.

10. A projector comprising:
the light source device according to claim 9;
a light modulation device configured to modulate light emitted from the light source device; and
a projection optical device configured to project the light modulated by the light modulation device.

11. A light source device comprising:
a light source configured to emit the first light;
a first optical element which the first light enters, the first optical element being configured to transmit a part of the first light and reflect another part of the first light;
a wavelength conversion element according to claim 1, which one of the part of the first light and the another part of the first light enters, the wavelength conversion element being configured to emit the second light;
a diffusion element which the other of the part of the first light and the another part of the first light enters, the diffusion element being configured to diffuse the first light; and
a second optical element configured to combine the second light emitted from the wavelength conversion element and the first light emitted from the diffusion element.

12. The light source device according to claim 11, wherein
the first optical element is configured to change a ratio between an amount of transmitted light of the first light and an amount of reflected light of the first light.

13. The light source device according to claim 12, wherein
the first optical element has a plurality of optical members different in the ratio from each other, and
the plurality of optical members is replaced with each other with respect to a light path of the first light emitted from the light source.

14. The light source device according to claim 12, wherein
the first optical element has a driver, and an optical substrate including a plurality of light incident areas different in the ratio from each other,
the first light emitted from the light source enters at least one of the light incident areas, and
the driver rotates the optical substrate to switch between the light incident areas.

15. The light source device according to claim 11, wherein
the first optical element includes a light transmissive substrate, and a dielectric multilayer film provided to the light transmissive substrate.

16. The light source device according to claim 11, wherein
the second optical element includes one of a dichroic mirror configured to transmit the second light and reflect the first light, and a dichroic mirror configured to reflect the second light and transmit the first light.

17. The light source device according to claim 11, wherein
the first optical element branches the first light emitted from the light source into a component proceeding in a first direction along a virtual plane in which the light source, the first optical element, and the second optical element are arranged, and a component proceeding in a second direction which is perpendicular to the first direction, and is along the virtual plane,
the diffusion element reflects, toward the first direction, the first light branched from the first optical element in the second direction,
the wavelength conversion element converts the first light branched from the first optical element in the first direction into the second light, and emits the second light toward the second direction, and
the second optical element reflects, toward the second direction, a part of the first light emitted in the first direction from the diffusion element, and transmits, toward the second direction, the second light emitted in the second direction from the wavelength conversion element to combine the part of the first light and the second light with each other.

18. The light source device according to claim 11, wherein
the first optical element branches the first light emitted from the light source into a component proceeding in a first direction along a virtual plane in which the light source, the first optical element, and the second optical element are arranged, and a component proceeding in a second direction which is perpendicular to the first direction, and is along the virtual plane,
the diffusion element reflects, toward the second direction, the first light branched from the first optical element in the first direction,
the wavelength conversion element converts the first light branched from the first optical element in the second direction into the second light, and emits the second light toward the first direction, and
the second optical element transmits, toward the second direction, a part of the first light emitted in the second direction from the diffusion element, and reflects, toward the second direction, the second light emitted in the first direction from the wavelength conversion element to combine the part of the first light and the second light with each other.

19. The light source device according to claim 11, further comprising
a mirror configured to reflect the first light, wherein
the first optical element branches the first light emitted from the light source into a component proceeding in a first direction along a virtual plane in which the light source, the first optical element, and the second optical element are arranged, and a component proceeding in a second direction which is perpendicular to the first direction, and is along the virtual plane,
the mirror reflects, toward the first direction, the first light branched from the first optical element in the second direction,
the diffusion element transmits toward the first direction, the first light reflected toward the first direction from the mirror,
the wavelength conversion element converts the first light branched from the first optical element in the first direction into the second light, and emits the second light toward the second direction, and
the second optical element reflects, toward the second direction, a part of the first light emitted in the first direction from the diffusion element, and transmits, toward the second direction, the second light emitted in the second direction from the wavelength conversion element to combine the part of the first light and the second light with each other.

20. The light source device according to claim 11, further comprising:
- a mirror configured to reflect the first light, wherein
- the first optical element branches the first light emitted from the light source into a component proceeding in a first direction along a virtual plane in which the light source, the first optical element, and the second optical element are arranged, and a component proceeding in a second direction which is perpendicular to the first direction, and is along the virtual plane,
- the mirror reflects, toward the second direction, the first light branched from the first optical element in the first direction,
- the diffusion element transmits, toward the second direction, the first light reflected toward the second direction from the mirror,
- the wavelength conversion element converts the first light branched from the first optical element in the second direction into the second light, and emits the second light toward the first direction, and
- the second optical element transmits, toward the second direction, a part of the first light emitted in the second direction from the diffusion element, and reflects, toward the second direction, the second light emitted in the first direction from the wavelength conversion element to combine the part of the first light and the second light with each other.

21. The light source device according to claim 11, further comprising
- a reflecting element configured to reflect the first light emitted from the wavelength conversion element and enters the reflecting element via the second optical element.

22. A light source device comprising:
- a light source configured to emit a first light having a first wavelength band;
- a first optical element which the first light enters, the first optical element being configured to transmit a part of the first light and reflect another part of the first light;
- a wavelength conversion element which one of the part of the first light and the another part of the first light enters, the wavelength conversion element being configured to emit a second light having a second wavelength band different from the first wavelength band;
- a diffusion element which the other of the part of the first light and the another part of the first light enters, the diffusion element being configured to diffuse the first light; and
- a second optical element configured to combine the second light emitted from the wavelength conversion element and the first light emitted from the diffusion element, wherein the wavelength conversion element includes
- a wavelength conversion layer having a light incident surface, the wavelength conversion layer being configured to convert the first light which is incident on the light incident surface into the second light,
- a substrate having a support surface configured to support the wavelength conversion layer,
- a first optical member having a first optical layer configured to transmit the first light and reflect the second light, the first optical layer facing the support surface,
- a second optical member having a second optical layer configured to reflect the second light, the second optical layer crossing the support surface and the first optical layer, and
- a third optical member having a third optical layer configured to reflect the second light, the third optical layer crossing the support surface and the first optical layer and facing the second optical layer, an opening is formed by the substrate, the first optical member, the second optical member, and the third optical member, a first area of the light incident surface of the wavelength conversion layer is larger than a second area of a light incident area on which the first light is incident in the light incident surface, the second area of the light incident area is larger than a third area of the opening, and the second light is emitted from the opening.

23. A projector comprising:
- the light source device according to claim 22;
- a light modulation device configured to modulate light emitted from the light source device; and
- a projection optical device configured to project the light modulated by the light modulation device.

* * * * *